(12) United States Patent
Umezu et al.

(10) Patent No.: US 8,483,953 B2
(45) Date of Patent: Jul. 9, 2013

(54) MAP INFORMATION PROCESSING APPARATUS

(75) Inventors: Masaharu Umezu, Tokyo (JP); Atsushi Kohno, Tokyo (JP); Kiyoshi Matsutani, Tokyo (JP); Tomoya Ikeuchi, Tokyo (JP); Makoto Mikuriya, Tokyo (JP); Tomohiro Nakae, Tokyo (JP); Yasushi Kodaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 944 days.

(21) Appl. No.: 12/595,143

(22) PCT Filed: Jan. 18, 2008

(86) PCT No.: PCT/JP2008/050639
§ 371 (c)(1),
(2), (4) Date: Oct. 8, 2009

(87) PCT Pub. No.: WO2008/126431
PCT Pub. Date: Oct. 23, 2008

(65) Prior Publication Data
US 2010/0063727 A1 Mar. 11, 2010

(30) Foreign Application Priority Data
Apr. 9, 2007 (JP) ................................. 2007-101890

(51) Int. Cl.
*G01C 21/32* (2006.01)
(52) U.S. Cl.
USPC ........... 701/424; 701/409; 701/410; 701/411; 701/417; 701/425; 701/430; 701/450; 701/461; 701/532; 701/533

(58) Field of Classification Search
USPC ................. 701/409, 410, 411, 414, 417, 424, 701/425, 430, 450, 461, 532, 533; 707/E17.018
See application file for complete search history.

(56) References Cited

U.S. PATENT DOCUMENTS 4,982,332 A * 1/1991 Saito et al. .................... 701/450
6,154,152 A 11/2000 Ito (Continued)

FOREIGN PATENT DOCUMENTS

| DE | 4230299 A1 | 3/1994 |
| DE | 19847375 A1 | 5/1999 |
| DE | 102005039893 A1 | 3/2006 |
| DE | 112005000048 T5 | 7/2006 |
| DE | 102005008185 A1 | 8/2006 |

(Continued)

*Primary Examiner* — Khoi Tran
*Assistant Examiner* — Stephen Holwerda
(74) *Attorney, Agent, or Firm* — Birch, Stewart, Kolasch & Birch, LLP

(57) ABSTRACT

A map information processing apparatus is disclosed. The apparatus includes a processor for calculating a vehicle position; a data generation unit for generating traveling locus data on the basis of the calculated vehicle position when the vehicle position deviates from a road; a registration unit for registering the traveling locus data generated by the data generation unit in a temporarily registered road list as a temporarily registered road; an operation unit for selecting one of temporarily registered roads registered in the temporarily registered road list; and an official registration unit for registering the selected temporarily registered road in an officially registered road list as an officially registered road in accordance with an instruction from the operation unit, generating road data on the basis of traveling locus data relating to the temporarily registered road, and adding the generated road data to a map data stored in a map data storage unit.

18 Claims, 26 Drawing Sheets

U.S. PATENT DOCUMENTS

| | | | |
|---|---|---|---|
| 6,546,334 B1 * | 4/2003 | Fukuchi et al. | 701/532 |
| 2003/0045999 A1 * | 3/2003 | Joerg et al. | 701/209 |
| 2005/0038595 A1 | 2/2005 | Yokota et al. | |
| 2005/0102098 A1 * | 5/2005 | Montealegre et al. | 701/209 |
| 2006/0047420 A1 * | 3/2006 | Tanaka | 701/208 |
| 2006/0111837 A1 | 5/2006 | Tauchi | |
| 2006/0217879 A1 | 9/2006 | Ikeuchi et al. | |
| 2006/0268406 A1 * | 11/2006 | McMahon et al. | 359/487 |
| 2007/0168121 A1 * | 7/2007 | Adachi | 701/208 |

FOREIGN PATENT DOCUMENTS

| | | |
|---|---|---|
| JP | 2003-130656 A | 5/2003 |
| JP | 2004-212253 A | 7/2004 |
| JP | 2004-251790 A | 9/2004 |
| JP | 2006-53123 A | 2/2006 |
| JP | 2006-170970 A | 6/2006 |
| JP | 2006-242754 A | 9/2006 |
| JP | 2008-070149 A | 3/2008 |
| WO | WO 2004076977 A1 * | 9/2004 |

\* cited by examiner

Map Data Format (overall)

Road Data Format (a) Node Data (b) Link Data

Traveling Locus Data Format

Temporarily Registered Road List

Officially Registered Road List

Temporary Registration Prohibited Area Data

Temporary Registration Prohibited Area List

Temporary Registration Prohibited Area

FIG. 33
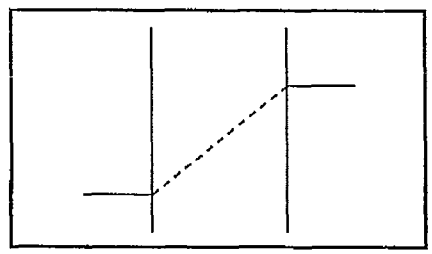
FIG. 34
FIG. 35
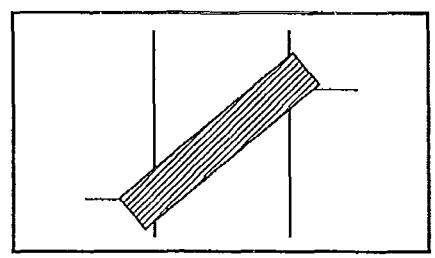

Official Registration Candidate List

Inter-temporarily Registered Road Traveling Locus Data

Inter-Temporarily Registered Road Traveling Locus Data List

MAP INFORMATION PROCESSING APPARATUS

TECHNICAL FIELD

The present invention relates to a map information processing apparatus for processing map data, and more particularly to a technique for reflecting a new road in the map data while traveling along the new road.

BACKGROUND ART

A car navigation apparatus holds map data including road data, facility data, and so on, and uses these map data to realize functions such as calculating and displaying a vehicle position, searching for a route to a destination, and providing guidance along the route. However, road data relating to an existing road may not be included in the map data, and in this case, the above functions cannot be realized.

In response to this problem, methods of adding road data relating to a road that is not included in the map data to the map data have been proposed. For example, Patent Document 1 discloses a vehicle navigation apparatus which makes route searches, route guidance, and so on that are useful to a user possible by updating map data without increasing a load on the user. In this navigation apparatus, map data stored on a CD-ROM, a DVD-ROM, or the like are updated by generating and storing new road information based on data relating to a traveling locus of the vehicle throughout the duration of a condition in which the vehicle is determined to be traveling on a road that does not exist in the map data, whereupon the updated map data are used for map display, route searches and route guidance.

Further, errors in the traveling locus may lead to cases in which incorrect roads are added to a map, and as a technique for preventing this problem, Patent Document 2 discloses a vehicle display apparatus which, when the vehicle travels on a new road not included in an existing map database, updates road data even if the vehicle only travels on the road once, rather than repeatedly, provided that position information is reliable. This vehicle display apparatus has a navigation function, and when the vehicle travels on a new road not included in the map database for the first time, the apparatus determines the reliability of vehicle position information from a number of receivable satellites and so on. When the positional accuracy is reliable, the road is recognized and registered in the form of road data. Thereafter, the new road serves as a display and route search subject.

Further, Patent Document 3 discloses a vehicle navigation apparatus which, when map data relating to the temporary road are generated, allows a user to use the temporary road flexibly in certain cases after the user has acknowledged that a problem exists in the reliability of the map data. In this vehicle navigation apparatus, a temporary road map data generation unit generates temporary road map data on the basis of processing results from a locator unit, a map matching unit, and a road deviation determination unit. The generated temporary road map data are registered in a map database by a temporary road map data registration unit. At the time of registration, a temporary road flag is attached to the temporary road map data, and a link of an official road to which the temporary road is connected is divided into a plurality of links. Divided link data are then registered in the map database with a post-division flag attached, while undivided link data are left in the map database with a pre-division flag attached.

Patent Document 1: Japanese Unexamined Patent Application No. 2004-251790
Patent Document 2: Japanese Unexamined Patent Application No. 2003-130656
Patent Document 3: Japanese Unexamined Patent Application No. 2006-242754

The conventional techniques described above have the following problems. In the technique disclosed in Patent Document 1, road data relating to a new road are generated on the basis of vehicle traveling locus data throughout the duration of a condition in which the vehicle is determined to be traveling on a road that does not exist in the map data, and the map data are updated by adding the generated road data thereto. Hence, an incorrect road may be added to the map due to errors in the traveling locus or the like.

Further, in the technique disclosed in Patent Document 2, the reliability of the vehicle position may not always be determined correctly, and in locations where the number of receivable satellites is limited due to the effects of peripheral buildings, roads, and so on, road data cannot be added. Furthermore, in the technique disclosed in Patent Document 3, the user chooses whether or not to use an added road, and it is therefore impossible to use only correct roads.

DISCLOSURE OF THE INVENTION

This invention has been designed in response to the problems described above, and an object thereof is to provide a map information processing apparatus that can generate map data including accurate added road data relating to a road that does not exist in the map data.

In order to achieve the object described above, a map information processing apparatus according to this invention includes: a map data storage unit for storing map data; a vehicle position calculation unit for calculating a vehicle position; a traveling locus data generation unit for generating traveling locus data on the basis of the vehicle position calculated by the vehicle position calculation unit when the vehicle position deviates from a road indicated by road data that are included in the map data read from the map data storage unit; a temporary registration unit for registering the traveling locus data generated by the traveling locus data generation unit in a temporarily registered road list as a temporarily registered road; an operation unit for selecting one of temporarily registered roads registered in the temporarily registered road list by the temporary registration unit; and an official registration unit for registering the temporarily registered road selected by the operation unit in an officially registered road list as an officially registered road in accordance with an instruction from the operation unit, generating road data on the basis of traveling locus data relating to the selected temporarily registered road, and adding the generated road data to the map data stored in the map data storage unit.

With the map information processing apparatus according to this invention, the traveling locus data are registered in the temporarily registered road list as a temporarily registered road, and in accordance with an instruction from the operation unit, the temporarily registered road is registered in the officially registered road list as an officially registered road, road data are generated on the basis of the traveling locus data of the temporarily registered road, and the generated road data are added to the map data stored in the map data storage unit. Therefore, a user can add a new road to the map data after verifying the temporarily registered road. As a result, map data including accurate added road data relating to a road that does not exist in the map data can be generated.

BRIEF DESCRIPTION OF THE DRAWINGS

FIG. 33 is a view showing an example of a temporarily registered road list screen displayed by a map information processing apparatus in accordance with an eighth embodiment of this invention;

FIG. 34 is a view showing a state in which a temporarily registered road is selected in the map information processing apparatus in accordance with the eighth embodiment of this invention;

FIG. 35 is a view showing a state in which a temporary registration prohibited area is set in the map information processing apparatus in accordance with the eighth embodiment of this invention;

BEST MODE FOR CARRYING OUT THE INVENTION

To describe this invention in further detail, preferred embodiments of the invention will be described below in accordance with the attached drawings. In the following description, a navigation apparatus is used as an example of a map information processing apparatus.

First Embodiment

Figure 1:
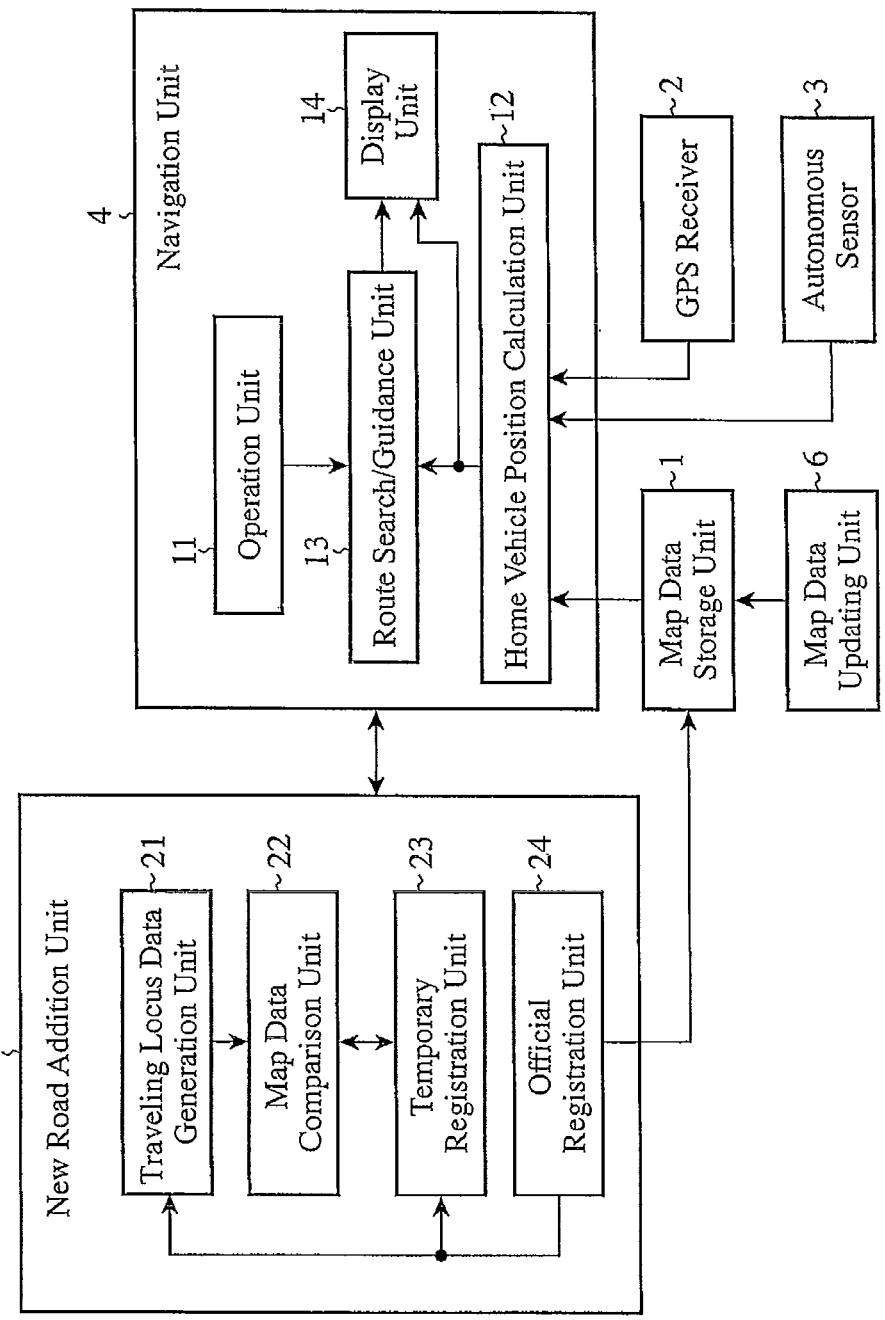
FIG. 1 is a block diagram showing a constitution of a map information processing apparatus in accordance with a first embodiment of this invention.

FIG. 1 is a block diagram showing the constitution of a map information processing apparatus in accordance with a first embodiment of this invention. The map information processing apparatus includes a map data storage unit 1, a GPS (Global Positioning System) receiver 2, an autonomous sensor 3, a navigation unit 4, a new road addition unit 5, and a map data updating unit 6.

The map data storage unit 1 is constituted by a DVD (Digital Versatile Disk) device, a hard disk device, or similar, for example, and stores map data. The map data stored in the map data storage unit 1 will be described in detail below. The map data stored in the map data storage unit 1 are read by the navigation unit 4 and the new road addition unit 5 and updated following writing and deletion by the new road addition unit 5.

The GPS receiver 2 receives a GPS signal from a GPS satellite, and detects an absolute position and an absolute bearing of the map information processing apparatus. The absolute position and absolute bearing detected by the GPS receiver 2 are transmitted to the navigation unit 4 as current position data. The GPS receiver 2 also transmits a signal indicating a reception condition of the GPS signal to the navigation unit 4. The signal indicating the reception condition is used to determine a reliability value, as will be described in detail below.

The autonomous sensor 3 is constituted by a gyro and a speed sensor, for example. The gyro detects an angular velocity of the vehicle during a turn and transmits the detected angular velocity to the navigation unit 4 as angular velocity data. The vehicle speed sensor detects a traveling speed of the vehicle on the basis of a vehicle speed pulse transmitted from the vehicle every time the vehicle travels a predetermined distance, and transmits the detected traveling speed to the navigation unit 4 as speed data. The angular velocity data and speed data are used to detect the current position through autonomous navigation.

The navigation unit 4 executes various types of processing for realizing a navigation function on the basis of the map data read from the map data storage unit 1, the current position data transmitted from the GPS receiver 2, the angular velocity data and speed data transmitted from the autonomous sensor 3, and various data exchanged with the new road addition unit 5. The navigation unit 4 will be described in detail below.

When the vehicle travels on a newly built road (to be referred to hereafter as a "new road") that does not exist in the map data stored in the map data storage unit 1, the new road addition unit 5 generates road data (to be described in detail below) relating to the new road on which the vehicle is traveling, and adds the generated road data to the map data stored in the map data storage unit 1. The new road addition unit 5 will be described in detail below. The map data updating unit 6 updates the map data stored in the map data storage unit 1 on the basis of map updating data provided periodically (yearly or monthly, for example) from a map data supply source.

Next, the navigation unit 4 will be described in detail. The navigation unit 4 includes an operation unit 11, a vehicle position calculation unit 12, a route search/guidance unit 13, and a display unit 14. The operation unit 11 is constituted by a remote controller, buttons, a touch panel, or similar for receiving user operations. The operation unit 11 is used to input an origin, a destination, a midway point, and so on, for example, and to allow the user to issue various instructions to the map information processing apparatus. The origin, destination, midway point, and so on input by operating the operation unit 11 are transmitted to the route search/guidance unit 13 as operation data, and the various instructions are transmitted to each corresponding units (to be described as necessary below).

The vehicle position calculation unit 12 detects an approximate position of the vehicle on the basis of the current position data transmitted from the GPS receiver 2 and/or the current position data that are generated through autonomous navigation using the angular velocity data and speed data transmitted from the autonomous sensor 3, and performs map matching using the detected approximate position and map data read from the map data storage unit 1 to calculate a current position of the vehicle. The current position of the vehicle calculated by the vehicle position calculation unit 12 is transmitted to the route search/guidance unit 13, the display unit 14, and the new road addition unit 5 as vehicle position data.

The route search/guidance unit 13 searches for a route from the current position indicated by the vehicle position data transmitted from the vehicle position calculation unit 12 or an origin indicated by the operation data transmitted from the operation unit 11 to a destination indicated by the operation data transmitted from the operation unit 11 on the basis of the map data read from the map data storage unit 1, and transmits the found route to the display unit 14 as route data. Further, the route search/guidance unit 13 calculates guidance intersections existing on the found route on the basis of the map data read from the map data storage unit 1, and transmits information relating to the calculated guidance intersections to the display unit 14 as intersection data.

The display unit 14 is constituted by a liquid crystal display, for example, and displays a map of the periphery of the vehicle generated on the basis of the map data read from the map data storage unit 1, an optimum route generated on the basis of the route data transmitted from the route search/guidance unit 13, a vehicle mark generated on the basis of the vehicle position data transmitted from the vehicle position calculation unit 12, an intersection guidance map generated on the basis of the intersection data transmitted from the route search/guidance unit 13, and so on. Thus, an image on which the vehicle mark, the optimum route to the destination, intersection guidance information, and so on are superimposed is displayed on a screen of the display unit 14.

Next, the new road addition unit 5 will be described in detail. The new road addition unit 5 includes a traveling locus data generation unit 21, a map data comparison unit 22, a temporary registration unit 23, and an official registration unit 24.

When the vehicle position indicated by the vehicle position data transmitted from the vehicle position calculation unit 12 of the navigation unit 4 deviates from a road indicated by road data included in the map data read from the map data storage unit 1, the traveling locus data generation unit 21 generates traveling locus data on the basis of the vehicle position data. The traveling locus data will be described in detail below. The traveling locus data generated by the traveling locus data generation unit 21 are transmitted to the map data comparison unit 22 and the temporary registration unit 23.

The map data comparison unit 22 compares the traveling locus data generated by the traveling locus data generation unit 21 with traveling locus data relating to a registered road registered in a temporarily registered road list provided in the temporary registration unit 23. A comparison result generated by the map data comparison unit 22 is transmitted to the temporary registration unit 23. The temporary registration unit 23 generates a temporarily registered road on the basis of the traveling locus data transmitted from the traveling locus data generation unit 21, and registers the temporarily registered road in the temporarily registered road list provided in its interior. In accordance with an instruction from the operation unit 11 of the navigation unit 4, the official registration unit 24 registers the temporarily registered road registered in the temporarily registered road list by the temporary registration unit 23 in an officially registered road list provided in its interior as an officially registered road, generates road data corresponding to the officially registered road, and adds the generated road data to the map data stored in the map data storage unit 1.

Figure 2:
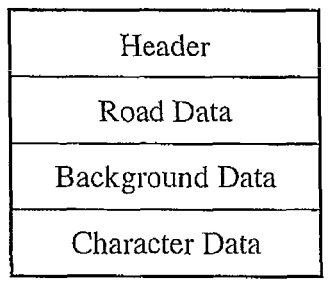
FIG. 2 is a view showing a format of map data used by the map information processing apparatus in accordance with the first embodiment of this invention.

Next, the main data used by the map information processing apparatus in accordance with the first embodiment will be described in detail. FIG. 2 shows a format of the map data stored in the map data storage unit 1. The map data are constituted by header, road data, background data, and character data. The header includes information such as the version of the map data and the storage position and size of the road data, background data, and character data.

Figure 3:
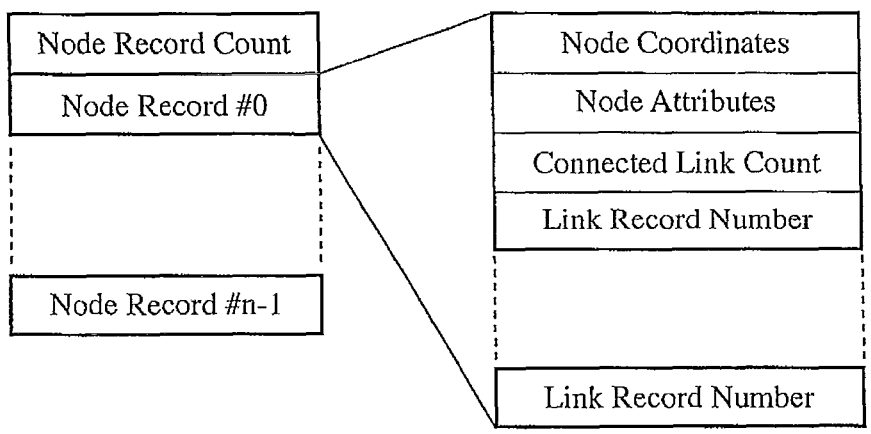
FIG. 3 is a view showing a format of road data used by the map information processing apparatus in accordance with the first embodiment of this invention.
Figure 3:
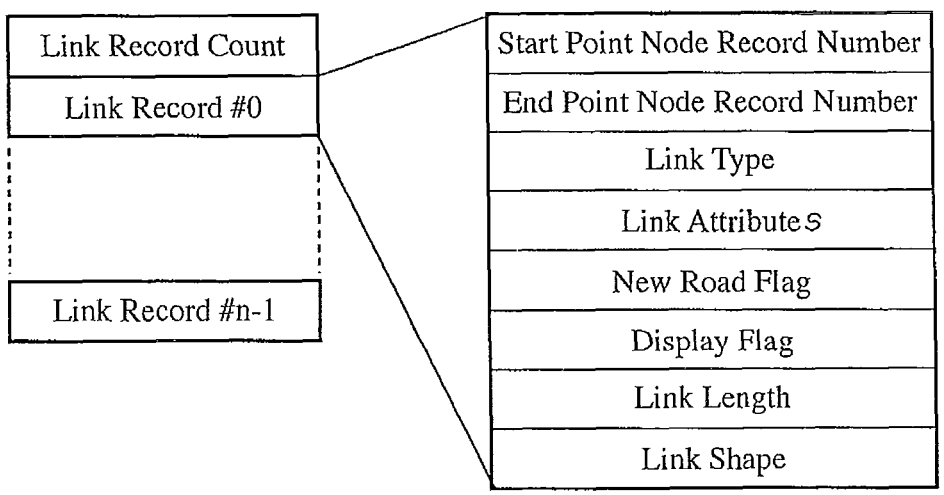

The road data, which will be described in detail below, are constituted by data for defining roads according to nodes and links. The background data are constituted by data for defining map backgrounds. The character data are constituted by data representing characters displayed on the map. FIG. 3 shows a format of the road data. As shown in FIG. 3(*a*), node data for defining a node are constituted by a node record count and node records #0 to #n−1 (where n is a positive integer). Each node record is constituted by a node coordinate, a node attribute, a connected link count, and link record numbers each defining a connected link.

Further, as shown in FIG. 3(*b*), link data for defining a link are constituted by a link record count and link records #0 to #n−1. Each link record is constituted by a start point node record number, an end point node record number, a link type, a link attribute, a new road flag, a display flag, a link length, and a link shape.

Figure 4:
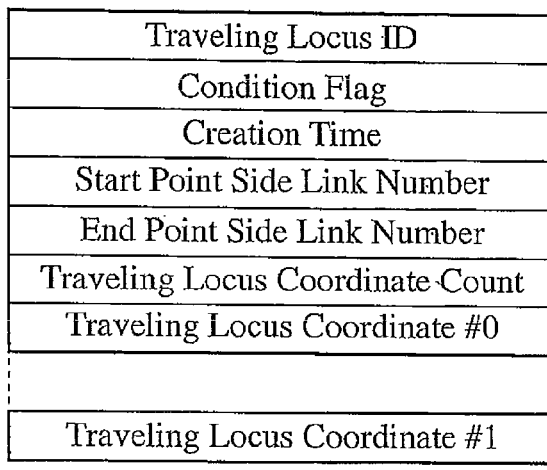
FIG. 4 is a view showing a format of traveling locus data used by the map information processing apparatus in accordance with the first embodiment of this invention.

FIG. 4 is a view showing a format of the traveling locus data generated by the traveling locus data generation unit 21. The traveling locus data are constituted by a traveling locus ID, a condition flag, a creation time, a start point side link number, an end point side link number, a traveling locus coordinate count, and traveling locus coordinates #0 to #n.

Figure 5:
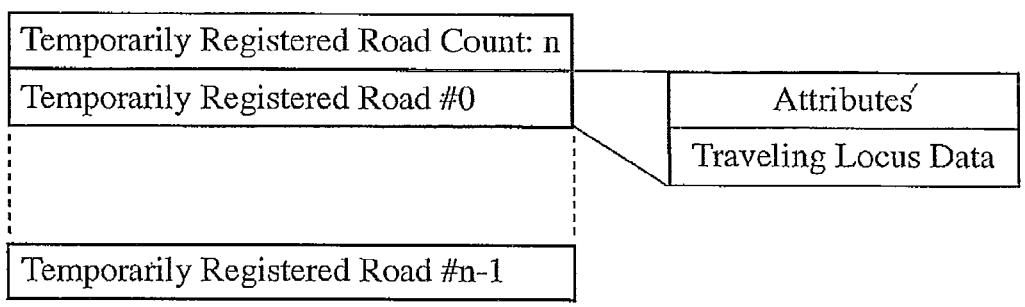
FIG. 5 is a view showing a constitution of a temporarily registered road list provided in the interior of a temporary registration unit of the map information processing apparatus in accordance with the first embodiment of this invention.
Figure 6:
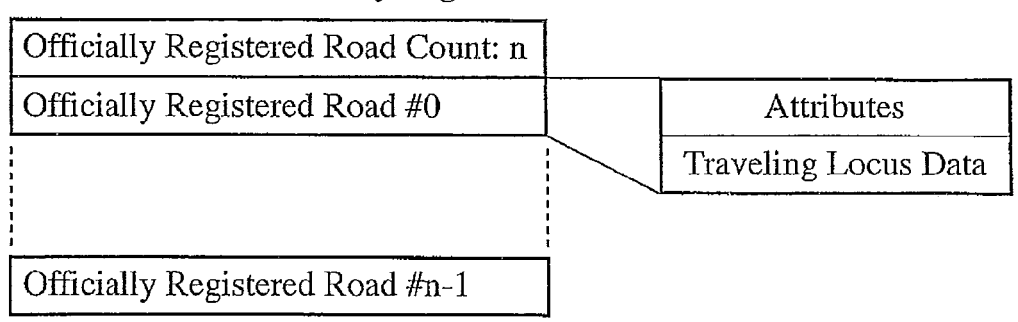
FIG. 6 is a view showing a constitution of an officially registered road list provided in the interior of an official registration unit of the map information processing apparatus in accordance with the first embodiment of this invention.

FIG. 5 is a view showing the constitution of the temporarily registered road list provided in the interior of the temporary registration unit 23. The temporarily registered road list is constituted by a temporarily registered road count (n) and temporarily registered roads #0 to #n−1, and each temporarily registered road is constituted by attributes and traveling locus data. FIG. 6 is a view showing the constitution of the officially registered road list provided in the interior of the official registration unit 24. The officially registered road list is constituted by an officially registered road count (n) and officially registered roads #0 to #n−1, and each officially registered road is constituted by attributes and traveling locus data.

Figure 7:
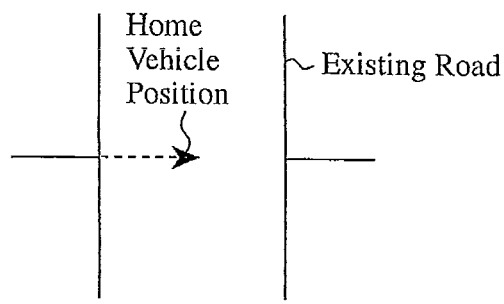
FIG. 7 is a view showing an example of a screen displayed during a temporary registration operation in the map information processing apparatus in accordance with the first embodiment of this invention.
Figure 8:
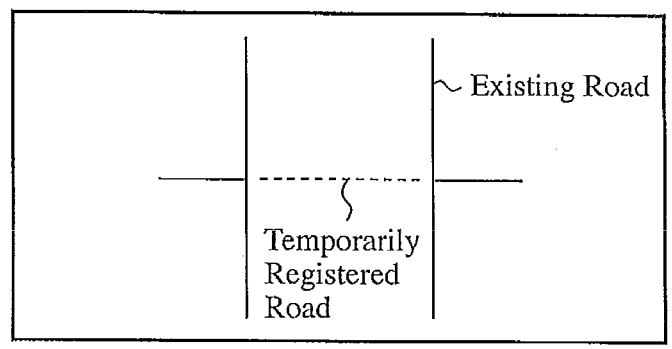
FIG. 8 is a view showing an example of a screen displayed when temporary registration is completed in the map information processing apparatus in accordance with the first embodiment of this invention.
Figure 9:
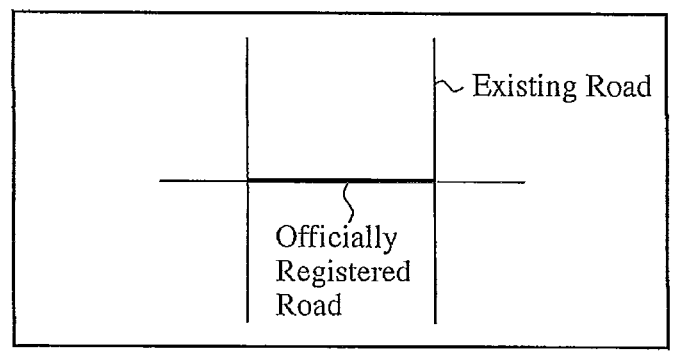
FIG. 9 is a view showing an example of a screen displayed when official registration is completed in the map information processing apparatus in accordance with the first embodiment of this invention.

Next, examples of screens displayed by the map information processing apparatus in accordance with the first embodiment will be described. FIG. 7 shows an example of a screen displayed during a temporary registration operation. In a temporary registration operation, when the vehicle position, which is indicated by a triangular mark, deviates from a road that already exists on the map, which is indicated by solid lines, a traveling locus indicated by a broken line is calculated and stored successively as traveling locus data. FIG. 8 shows an example of a screen displayed at the end of temporary registration. After completion of temporary registration, a temporarily registered road is displayed in the format (a broken line) that is distinguishable from that of existing roads on the map as indicated by solid lines. FIG. 9 shows an example of a screen displayed after completion of official registration. After the completion of official registration, an officially registered road is displayed in a format (a thick solid line) that is distinguishable from that of existing roads on the map as indicated by solid lines.

Figure 12:
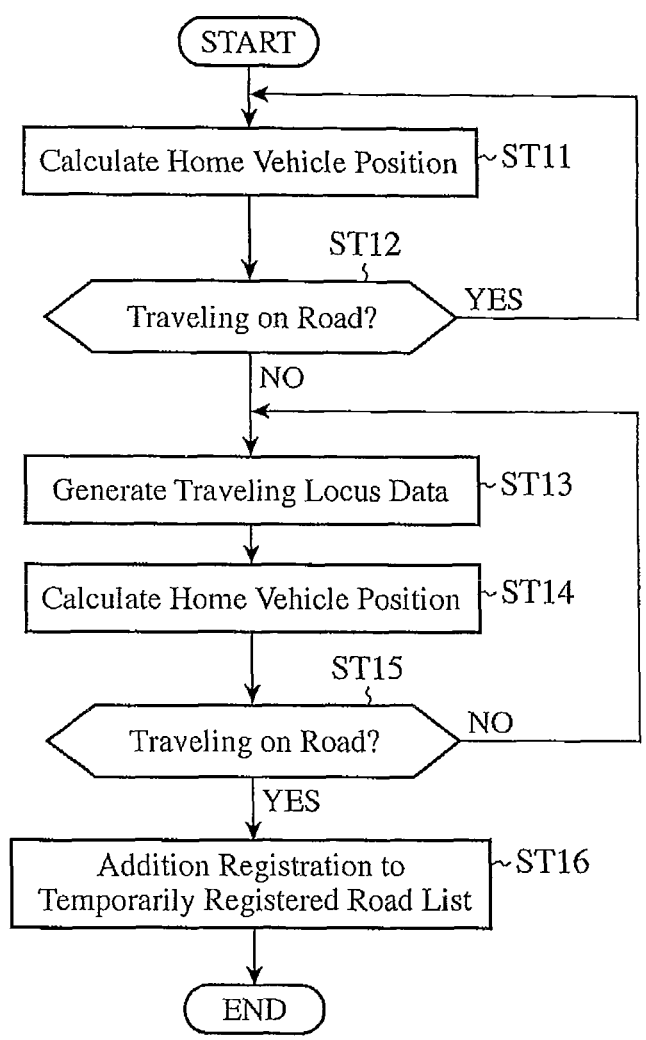
FIG. 12 is a flowchart showing an operation of the map information processing apparatus in accordance with the first embodiment of this invention, centering on temporary registration processing.

Next, an operation of the map information processing apparatus in accordance with the first embodiment of this invention constituted as described above will be described with reference to a flowchart shown in FIG. 12, centering on temporary registration processing. In the temporary registration processing, first, the vehicle position is calculated (step ST11). More specifically, the vehicle position calculation unit 12 of the navigation unit 4 detects the approximate position of the vehicle on the basis of the current position data transmitted from the GPS receiver 2 and/or the current position data generated through autonomous navigation using the angular velocity data and speed data transmitted from the autonomous sensor 3, and calculates the current position of the vehicle through map matching using the detected approximate position and the map data read from the map data storage unit 1. The current position of the vehicle calculated by the vehicle position calculation unit 12 is transmitted to the new road addition unit 5 as vehicle position data.

Next, a determination is made as to whether or not the vehicle is traveling on a road (step ST12). More specifically, the traveling locus data generation unit 21 of the new road addition unit 5 determines whether or not the vehicle position indicated by the vehicle position data transmitted from the vehicle position calculation unit 12 exists on an existing road indicated by road data included in the map data read from the map data storage unit 1. When it is determined in the step ST12 that the vehicle is traveling on a road, the sequence returns to the step ST11, where the processing described above is repeated.

When it is determined in the step ST12 that the vehicle is not traveling on a road, on the other hand, a condition in which travel on a new road has begun is acknowledged, and the traveling locus data are generated (step ST13). More specifically, the traveling locus data generation unit 21 generates traveling locus data having the format shown in FIG. 4 using coordinates indicated by the vehicle position data transmitted from the vehicle position calculation unit 12 as a traveling locus coordinate, and stores the generated traveling locus data in its interior.

Next, the vehicle position is calculated (step ST14). The processing of the step ST14 is identical to the processing of the step ST11, described above. Next, a determination is made as to whether or not the vehicle is traveling on a road (step ST15). The processing of the step ST15 is identical to the processing of the step ST12, described above. When it is determined in the step ST15 that the vehicle is not traveling on a road, or in other words that the vehicle has not returned to an existing road, the sequence returns to the step ST13, where the processing described above is repeated. Through this repetition, the traveling locus data generation unit 21 successively adds traveling locus coordinates to the pre-stored traveling locus data.

When it is determined in the step ST15 that the vehicle is traveling on a road, a condition in which the vehicle has returned to an existing road existing in the map data from a new road is acknowledged, and addition registration to the temporarily registered road list is performed (step ST16). More specifically, the traveling locus data generation unit 21 transmits the traveling locus data generated through the processing of the steps ST11 to ST15 described above to the temporary registration unit 23. The temporary registration unit 23 adds the traveling locus data received from the traveling locus data generation unit 21 to the temporarily registered road list shown in FIG. 5 as a temporarily registered road. The temporary registration processing is then completed.

Note that when temporary registration for adding a temporarily registered road to the temporarily registered road list is complete, the temporary registration unit 23 may display the added temporarily registered road on the display unit 14 in the format that is distinguishable from the format of existing roads and officially registered roads, as shown in FIG. 8. According to this constitution, a user can easily verify a temporarily registered road added to the temporarily registered road list.

Figure 14:
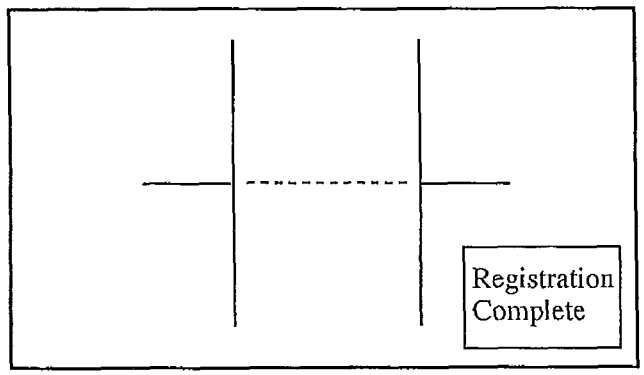
FIG. 14 is a view showing an example of a screen indicating registration completion, which is displayed when temporary registration is completed in the map information processing apparatus in accordance with the first embodiment of this invention.

Further, as shown in FIG. 14, the temporary registration unit 23 may display "registration complete", for example, on the display screen of the display unit 14 when temporary registration is complete. According to this constitution, the user can learn that temporary registration is complete, and can therefore verify the temporarily registered road and implement official registration without forgetting.

Figure 15:
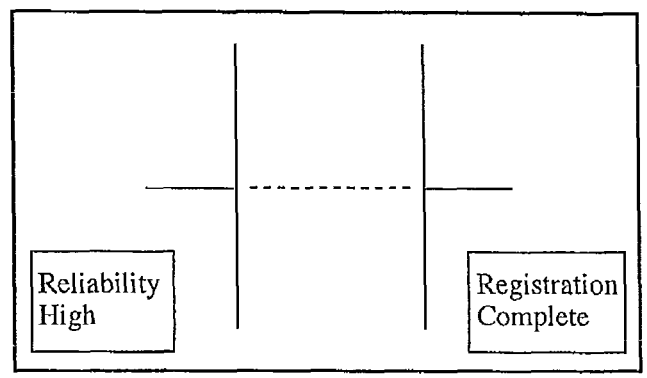
FIG. 15 is a view showing an example of a screen indicating registration completion and a reliability value, which is displayed when temporary registration is completed in the map information processing apparatus in accordance with the first embodiment of this invention.

Further, as shown in FIG. 15, the temporary registration unit 23 may display "registration complete" and a "reliability" value determined from the reception condition of the GPS receiver 2, for example, on the display screen of the display unit 14 when temporary registration is complete. According to this constitution, the user can decide whether or not to perform official registration after checking the reliability, and therefore correct new roads can be added to the map data. Note that the "reliability" value alone may be displayed. In this case, display of the "reliability" value indicates that temporary registration is complete.

Figure 10:
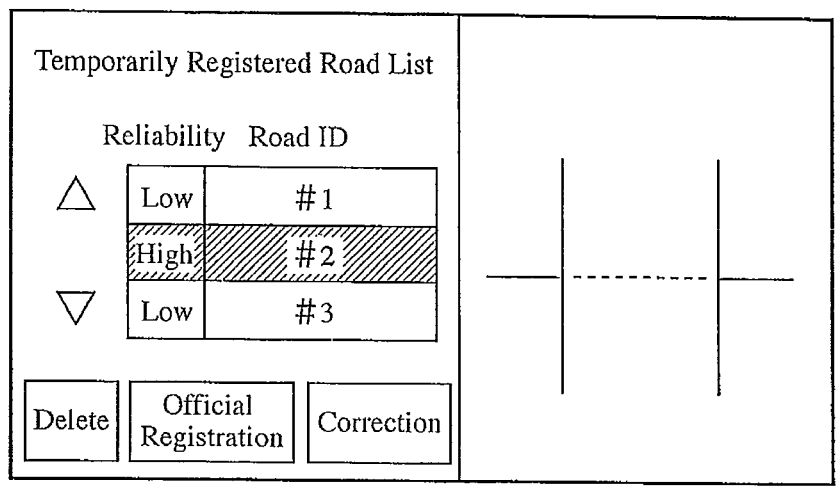
FIG. 10 is a view showing an example of a screen of a temporarily registered road list displayed by the map information processing apparatus in accordance with the first embodiment of this invention.

When temporary registration is complete as mentioned above, the user can call up a screen of the temporarily registered road list by operating the operation unit 11. FIG. 10 shows an example of the temporarily registered road list screen. Temporarily registered roads registered in the temporarily registered road list are indicated on the left half of the temporarily registered road list screen by road IDs having an attached reliability value. A temporarily registered road (indicated by a broken line) selected from the temporarily registered road list and an existing road to which the temporarily registered road is connected are displayed on the right half of the temporarily registered road list screen. FIG. 10 shows a state in which a temporarily registered road having "high" reliability and the road ID #2 has been selected.

Further, a "delete" button, an "official registration" button, and a "correction" button are provided on the left half of the temporarily registered road list screen. The "delete" button is used to delete the displayed temporarily registered road from the temporarily registered road list. The "official registration" button is used to register the displayed temporarily registered road officially. The "correct" button is used to correct the displayed temporarily registered road.

First, an operation in the case where the "delete" button is pressed will be described. When the "delete" button is pressed while a single temporarily registered road is selected on the temporarily registered road list screen, the selected temporarily registered road is deleted from the temporarily registered road list.

Figure 13:
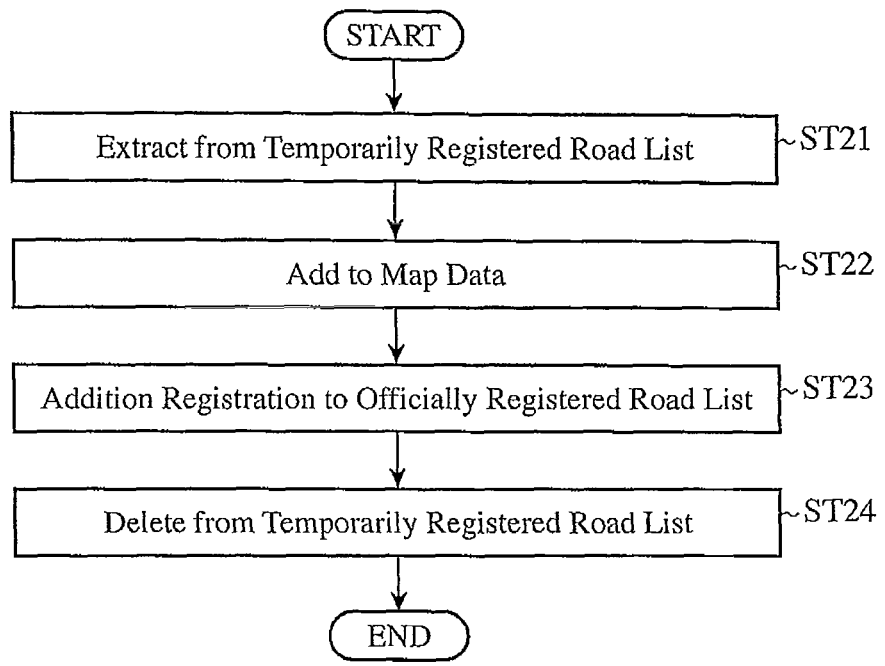
FIG. 13 is a flowchart showing an operation of the map information processing apparatus in accordance with the first embodiment of this invention, centering on official registration processing.

Next, an operation in the case where the "official registration" button is pressed will be described. When the "official registration" button is pressed while a single temporarily registered road is selected on the temporarily registered road list screen, the selected temporarily registered road is registered in the officially registered road list as an officially registered road, and road data corresponding to the registered officially registered road are added to the map data stored in the map data storage unit 1. The official registration processing for registering a temporarily registered road as an officially registered road will now be described with reference to a flowchart as shown in FIG. 13.

In the official registration processing, first, a temporarily registered road is extracted from the temporarily registered road list (step ST21). More specifically, the temporary registration unit 23 extracts a temporarily registered road selected from the temporarily registered road list and transmits the extracted temporarily registered road to the official registration unit 24. Next, an addition to the map data is performed (step ST22). More specifically, the official registration unit 24 generates road data on the basis of traveling locus data relating to the temporarily registered road received from the temporary registration unit 23, and transmits the generated road data to the map data storage unit 1. As a result, the road data are added to the map data in the map data storage unit 1. Roads added in this official registration processing can be used similarly to existing roads that is present in the map data.

Next, addition registration in the officially registered road list is performed (step ST23). More specifically, the official registration unit 24 adds the temporarily registered road received from the temporary registration unit 23 to the officially registered road list shown in FIG. 6 as an officially registered road. Next, the temporarily registered road registered as an officially registered road is deleted from the temporarily registered road list (step ST24). More specifically, the temporary registration unit 23 deletes the temporarily registered road transmitted to the official registration unit 24 from the temporarily registered road list. The official registration processing is then completed.

Note that when official registration for adding an officially registered road to the officially registered road list is complete, the official registration unit 24 may display the added officially registered road on the display unit 14 in the format that is distinguishable from that of existing roads and temporarily registered roads, as shown in FIG. 9. According to this constitution, the user can easily verify an officially registered road added to the officially registered road list and an officially registered road added to the map data in the map data storage unit as a new road.

Further, by operating the operation unit 11 during this official registration, attributes of the officially registered road can be set. According to this constitution, road attributes are always set during official registration, and therefore a situation in which the user forgets to set the attributes can be prevented.

Figure 16:
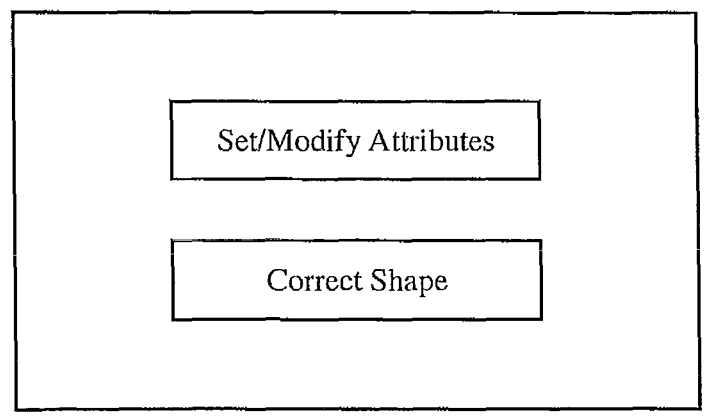
FIG. 16 is a view showing an example of a screen displayed when a correction button used in the map information processing apparatus in accordance with the first embodiment of this invention is pressed.
Figure 17:
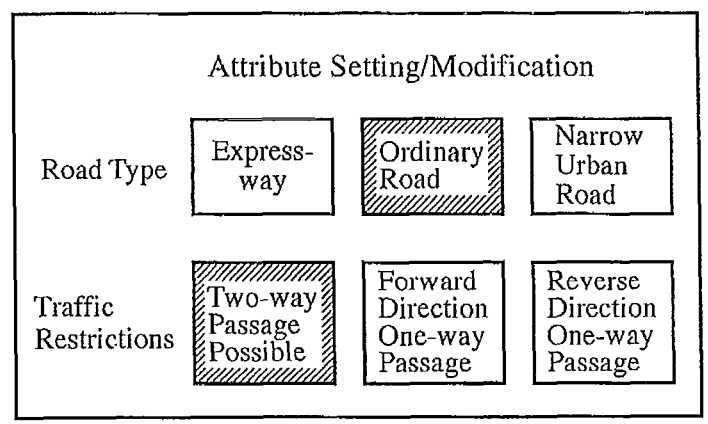
FIG. 17 is a view showing an example of a screen displayed when an attribute setting/modification button used in the map information processing apparatus in accordance with the first embodiment of this invention is pressed.

Next, an operation in the case where the "correction" button is pressed will be described. When the "correction" button is pressed while a single temporarily registered road is selected on the temporarily registered road list screen shown in FIG. 10, the screen switches to a screen provided with a "set/modify attributes" button and a "shape correction" button, as shown in FIG. 16. When the "set/modify attributes" button is pressed on this screen, the screen switches to an attribute setting/modification screen shown in FIG. 17. The attribute setting/modification screen is provided with an "expressway" button, an "ordinary road" button, and a "narrow urban road" button for specifying the road type, and a "two-way passage possible" button, a "forward direction one-way passage" button, and a "reverse direction one-way passage" button specifying traffic restrictions.

By pressing one of the "expressway" button, "ordinary road" button, and "narrow urban road" button, the road type of the selected temporarily registered road is specified, and by pressing one of the "two-way passage possible" button, "forward direction one-way passage" button, and "reverse direction one-way passage" button, traffic restrictions on the selected temporarily registered road are specified. In the example shown in FIG. 17, "ordinary road" is selected as the road type and "two-way passage possible" is selected as the traffic restrictions. The road type and traffic restrictions specified on the attribute setting/modification screen are set as the attributes of the selected temporarily registered road. With this constitution, correct road attributes can be set.

When the "shape correction" button is pressed on the screen shown in FIG. 16, the map screen including the temporarily registered road, shown in FIG. 8, is displayed. By performing tracing on the screen using a touch panel, for example, the user can correct the shape of the temporarily registered road on the map screen. As a result of this shape correction operation, the traveling locus data relating to the temporarily registered road are corrected. According to this constitution, a temporarily registered road having an incorrect traveling locus can be corrected to road data having a correct shape before being added to the map data.

Figure 11:
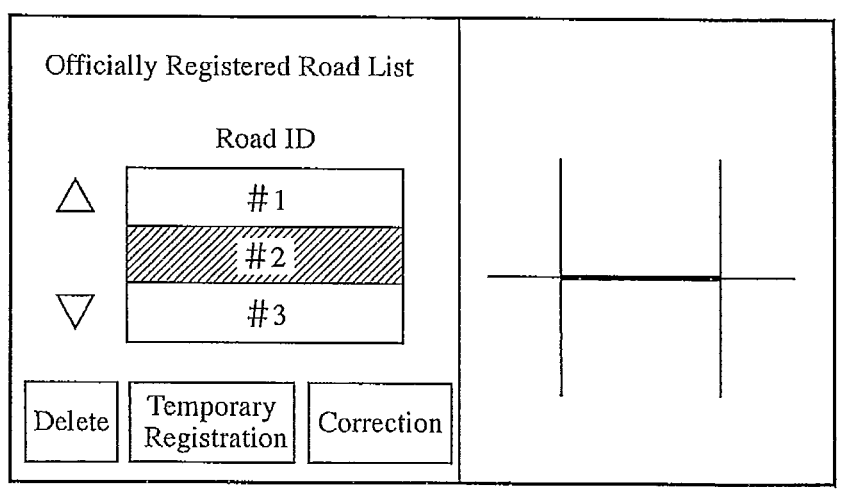
FIG. 11 is a view showing an example of a screen of an officially registered road list displayed by the map information processing apparatus in accordance with the first embodiment of this invention.

When the official registration is completed as mentioned above, the user can call up a screen of the officially registered road list by operating the operation unit 11. FIG. 11 shows an example of the officially registered road list screen. The officially registered roads registered in the officially registered road list are indicated on the left half of the officially registered road list screen by road IDs having an attached reliability value. An officially registered road (indicated by a thick solid line) selected from the officially registered road list and an existing road to which the officially registered road is connected are displayed on the right half of the officially registered road list screen. In the example shown in FIG. 11, an officially registered road having "high" reliability and the road ID #2 has been selected.

Further, a "delete" button, a "temporary registration" button, and a "correction" button are provided on the left half of the officially registered road list screen. The "delete" button is used to delete the displayed officially registered road from the officially registered road list and the map data. The "temporary registration" button is used to return the displayed officially registered road to a temporarily registered road. The "correction" button is used to correct the displayed officially registered road.

First, an operation performed when the "delete" button is pressed will be described. When the "delete" button is pressed while a single officially registered road is selected on the officially registered road list screen, the selected officially registered road is deleted from the officially registered road list and the map data stored in the map data storage unit 1.

Figure 18:
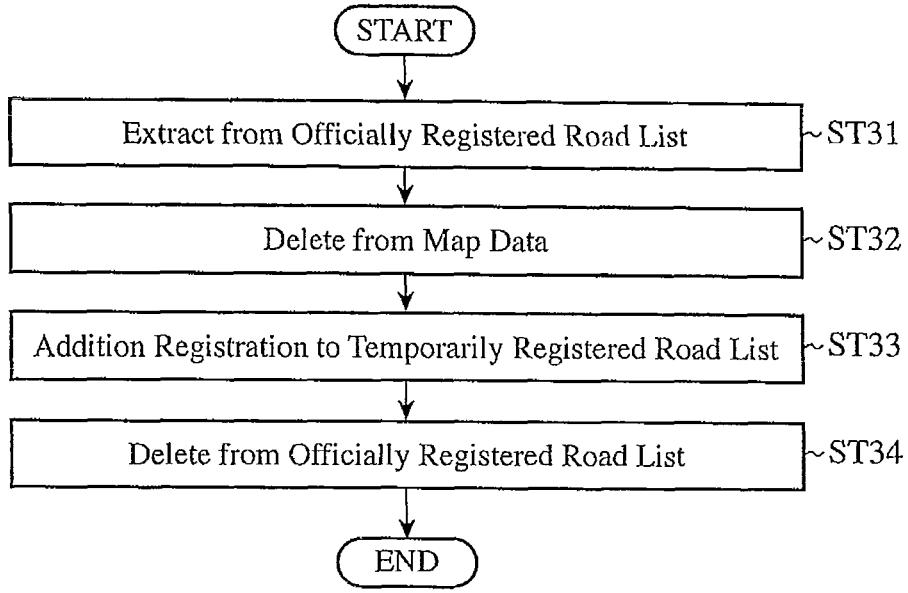
FIG. 18 is a flowchart showing an operation of the map information processing apparatus in accordance with the first embodiment of this invention, centering on reversion processing.

Next, an operation performed when the "temporary registration" button is pressed will be described. When the "temporary registration" button is pressed while a single officially registered road is selected on the officially registered road list screen, the selected officially registered road is returned to a temporarily registered road. Restoration processing for returning an officially registered road to a temporarily registered road will now be described with reference to a flowchart shown in FIG. 18. In the reversion processing, first, an officially registered road is extracted from the officially registered road list (step ST31). More specifically, the official registration unit 24 extracts an officially registered road selected from the officially registered road list and transmits the extracted officially registered road to the temporary registration unit 23. Next, deletion from the map data is performed (step ST32). More specifically, the official registration unit 24 deletes the road data corresponding to the temporarily registered road extracted in the step ST31 from the map data stored in the map data storage unit 1.

Next, an additional registration to the temporarily registered road list is performed (step ST33). The temporary registration unit 23 adds the officially registered road received from the official registration unit 24 to the temporarily registered road list shown in FIG. 6 as a temporarily registered road. Next, the officially registered road extracted from the officially registered road list in the step ST31 is deleted (step ST34). More specifically, the official registration unit 24 extracts the officially registered road from the officially registered road list and deletes them from the list. The restoration processing is then completed. Through the processing described above, an officially registered road can be returned to a temporarily registered road, and as a result, the temporarily registered road can be reused.

Note that when the restoration processing for returning an officially registered road to a temporarily registered road and adding the temporarily registered road to the temporarily registered road list is complete, the temporary registration unit 23 may display the restored temporarily registered road on the display unit 14 in the format that is distinguishable from that of existing roads and officially registered roads, as shown in FIG. 9. According to this constitution, a user can easily verify a temporarily registered road restored to the temporarily registered road list.

Next, an operation performed when the "correction" button is pressed will be described. When the "correction" button is pressed while a single officially registered road is selected on the officially registered road list screen, the screen switches to the screen provided with the "set/modify attributes" button and the "shape correction" button, shown in FIG. 16. When the "set/modify attributes" button is pressed on this screen, the screen switches to the attribute setting/modification screen shown in FIG. 17. By pressing one of the "expressway" button, "ordinary road" button, and "narrow urban road" button on the attribute setting/modification screen, the road type of the selected officially registered road is specified, and by pressing one of the "two-way passage possible" button, "forward direction one-way passage" button, and "reverse direction one-way passage" button, traffic restrictions on the selected officially registered road are specified. The road type and traffic restriction specified on the attribute setting/modification screen are reset as the attributes of the officially registered road selected at the timing of this setting.

Figure 19:
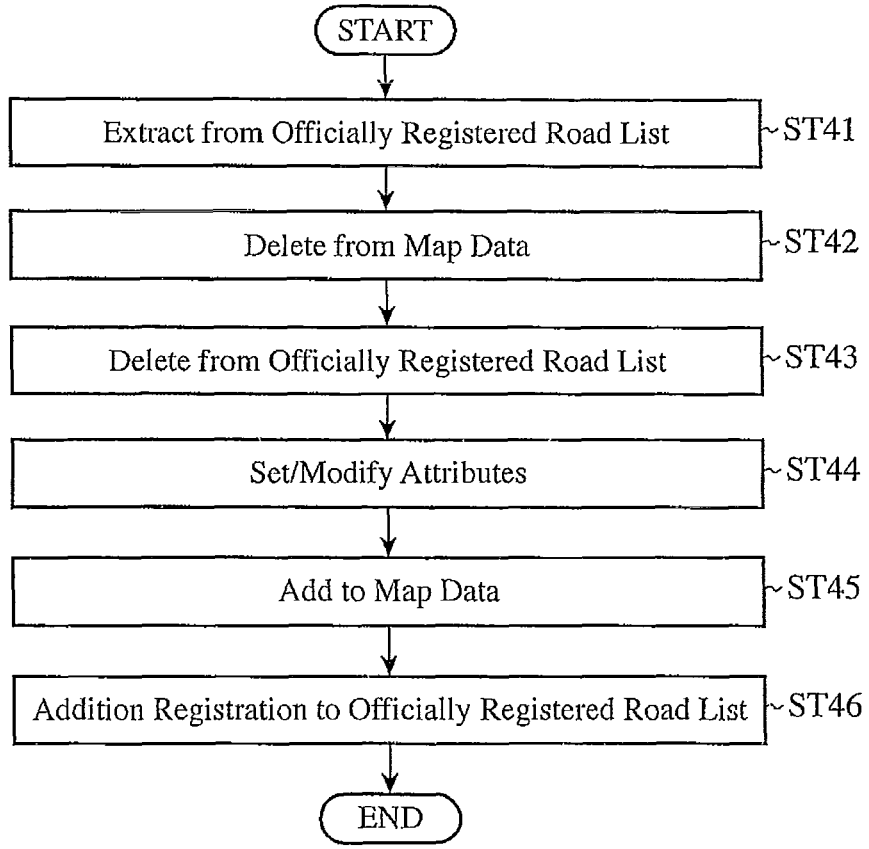
FIG. 19 is a flowchart showing attribute setting re-registration processing executed by the map information processing apparatus in accordance with the first embodiment of this invention.

FIG. 19 is a flowchart showing attribute setting re-registration processing for resetting the attributes of an officially registered road. In this attribute setting re-registration processing, first, an officially registered road is extracted from the officially registered road list (step ST41). More specifically, the official registration unit 24 extracts an officially registered road selected from the officially registered road list. Next, a deletion from the map data is performed (step ST42). More specifically, the official registration unit 24 deletes the attributes of the road data corresponding to the officially registered road extracted in the step ST41 from the map data stored in the map data storage unit 1.

Next, a deletion from the officially registered road list is performed (step ST43). More specifically, the official registration unit 24 deletes the attributes of the officially registered road extracted in the step ST41. Next, attribute setting/modification processing is performed (step ST44). More specifically, the official registration unit 24 sets the attributes selected in the above operation as the attributes of the officially registered road or modifies previously set attributes. Next, an addition to the map data is performed (step ST45). More specifically, the official registration unit 24 transmits the attributes set or modified in the step ST44 to the map data storage unit 1. As a result, the attributes of the road data corresponding to the officially registered road are set in the map data stored in the map data storage unit 1.

Next, addition registration to the officially registered road list is performed (step ST46). The official registration unit 24 adds the officially registered road having the attributes set or modified in the step ST44 to the officially registered road list. The attribute setting re-registration processing is then completed. Through the processing described above, the attributes of road data already added to the map data can be set or modified.

When the "shape correction" button is pressed on the screen shown in FIG. 16, the map screen including the officially registered road, shown in FIG. 9, is displayed. By performing tracing on the screen using a touch panel, for example, the user can correct the shape of the officially registered road on the map screen. As a result of this shape correction operation, the traveling locus data relating to the officially registered road are corrected.

Figure 20:
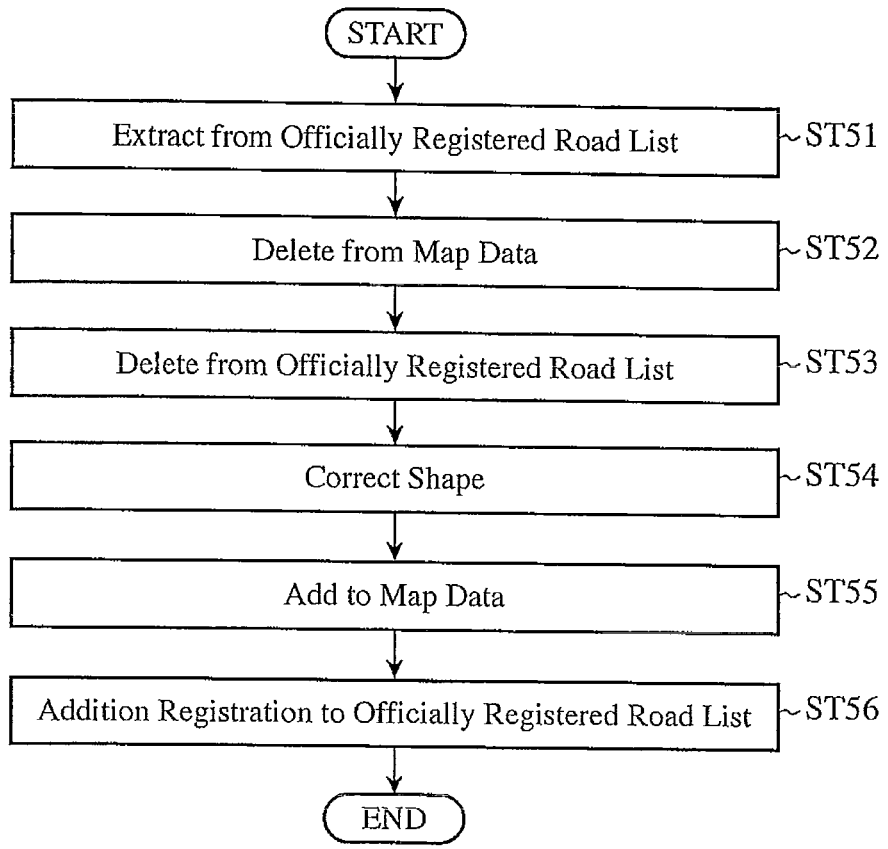
FIG. 20 is a flowchart showing shape correction re-registration processing executed by the map information processing apparatus in accordance with the first embodiment of this invention.

FIG. 20 is a flowchart showing shape correction re-registration processing for correcting the traveling locus data of an officially registered road. In the shape correction re-registration processing, first, an officially registered road is extracted from the officially registered road list (step ST51). More specifically, the official registration unit 24 extracts an officially registered road selected from the officially registered road list. Next, a deletion from the map data is performed (step ST52). More specifically, the official registration unit 24 deletes the traveling locus data of the road data corresponding to the officially registered road extracted in the step ST51 from the map data stored in the map data storage unit 1.

Next, a deletion from the officially registered road list is performed (step ST53). More specifically, the official registration unit 24 deletes the traveling locus data of the officially registered road extracted in the step ST51. Next, shape correction processing is performed (step ST54). More specifically, the official registration unit 24 corrects the traveling locus data through the above operation. Next, addition to the map data is performed (step ST55). More specifically, the official registration unit 24 transmits the shape corrected in the step ST54 to the map data storage unit 1. As a result, the traveling locus data of the road data corresponding to the officially registered road are modified in the map data stored in the map data storage unit 1.

Next, addition registration to the officially registered road list is performed (step ST56). The official registration unit 24 adds the officially registered road having the traveling locus data corrected in the step ST54 to the officially registered road list. The shape correction re-registration processing is then completed.

As described above, in accordance with the map information processing apparatus of the first embodiment of this invention, the user can add a new road to the map data as an officially registered road after verifying the temporarily registered road, and therefore correct new roads can be added.

Second Embodiment

A map information processing apparatus in accordance with a second embodiment of this invention corrects the traveling locus data when the vehicle is traveling on a road for which temporary registration has already been completed. The constitution of the map information processing apparatus in accordance with the second embodiment is identical to the constitution of the map information processing apparatus in accordance with the first embodiment, shown in FIG. 1.

Figure 22:
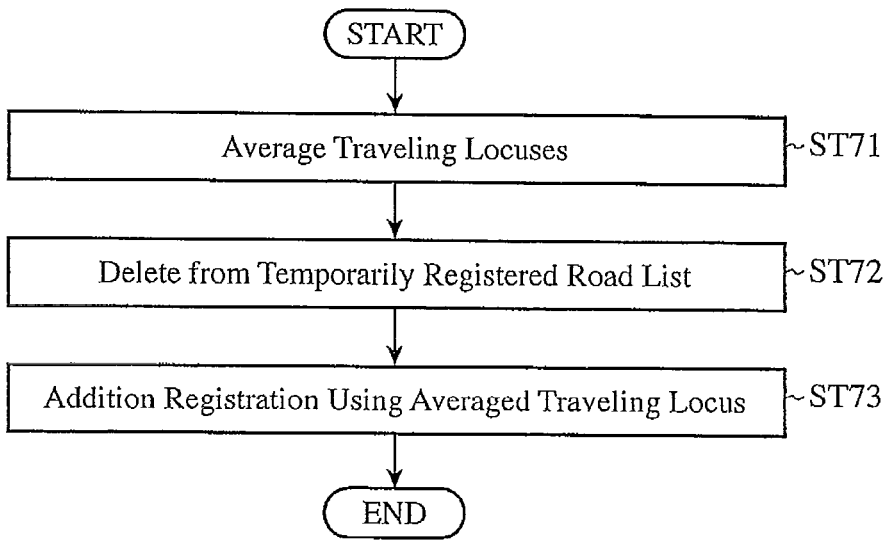
FIG. 22 is a flowchart showing in detail the correction registration processing to the temporarily registered road list shown in FIG. 21.
Figure 21:
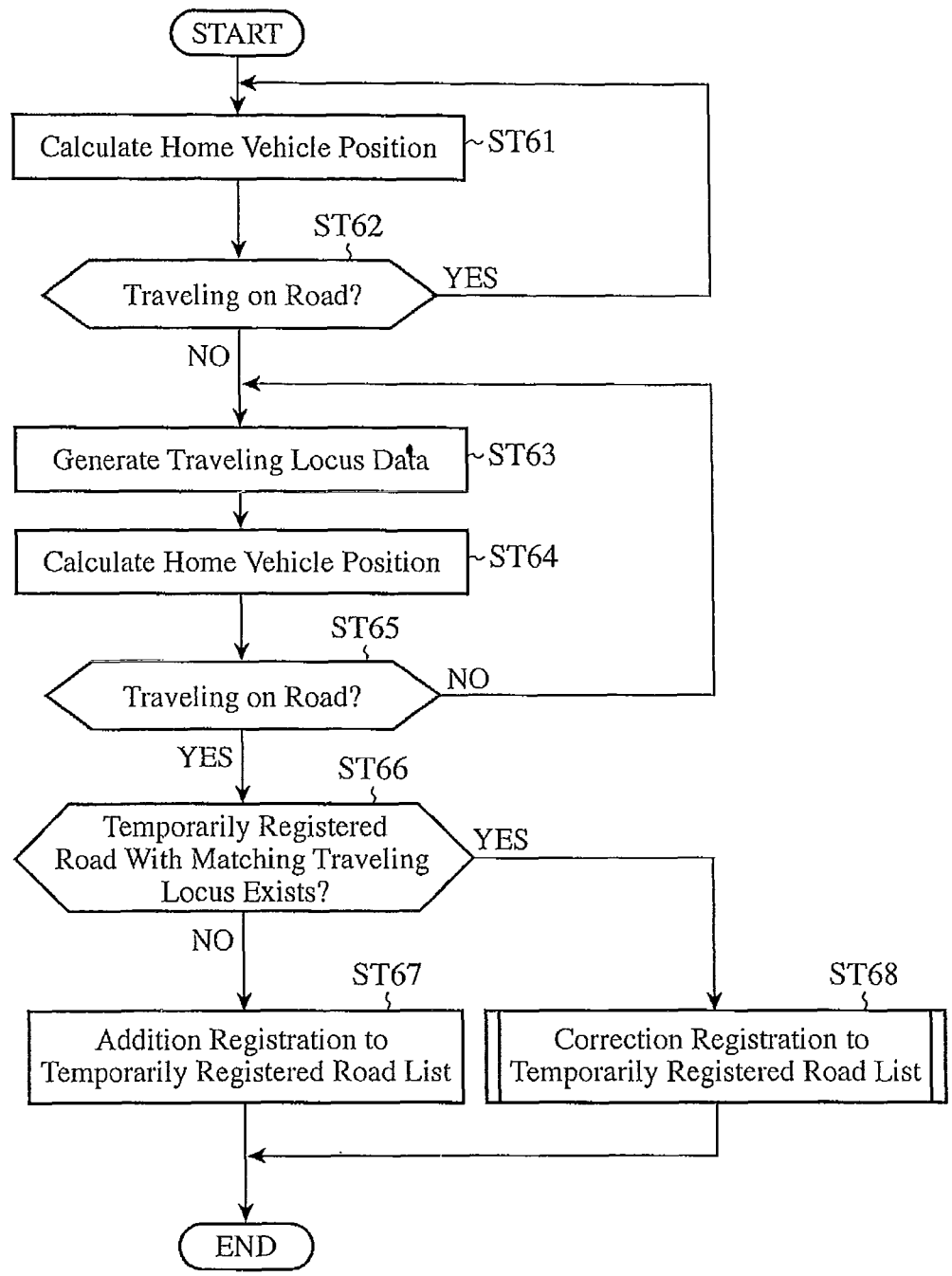
FIG. 21 is a flowchart showing traveling locus shape correction processing executed by a map information processing apparatus in accordance with a second embodiment of this invention.

An operation of the map information processing apparatus in accordance with the second embodiment will now be described with reference to flowcharts shown in FIGS. 21 and 22, centering on traveling locus shape correction processing. Processing performed in steps ST61 to ST65 of the traveling locus shape correction processing is identical to the processing of the steps ST11 to ST15 shown in the flowchart in FIG. 12, executed by the map information processing apparatus in accordance with the first embodiment.

When it is determined in the step ST65 that the vehicle is traveling on a road, a condition in which the vehicle has returned to an existing road existing in the map data from a new road is acknowledged, whereupon a determination is made as to whether or not a temporarily registered road having a matching traveling locus exists (step ST66). More specifically, the map data comparison unit 22 compares the traveling locus data generated by the traveling locus data generation unit 21 with traveling locus data relating to a registered road registered in the temporarily registered road list provided in the temporary registration unit 23, and transmits a comparison result to the temporary registration unit 23.

When it is determined in the step ST66 that a temporarily registered road having a matching traveling locus does not exist, addition registration to the temporarily registered road list is performed (step ST67). More specifically, the traveling locus data generation unit 21 transmits the traveling locus data generated in the processing of the steps ST61 to ST65 to the temporary registration unit 23. The temporary registration unit 23 adds the traveling locus data received from the traveling locus data generation unit 21 to the temporarily registered road list as a temporarily registered road. The traveling locus shape correction processing is then completed.

When it is determined in the step ST66 that a temporarily registered road having a matching traveling locus exists, correction registration processing to the temporarily registered road list is performed (step ST68). This correction registration processing will now be described in detail with reference to a flowchart shown in FIG. 22. In the correction registration processing, first, traveling locus averaging processing is performed (step ST71). More specifically, the temporary registration unit 23 generates new traveling locus data by averaging the traveling locus data generated by the traveling locus data generation unit 21 and the traveling locus data relating to the temporarily registered road registered in the temporarily registered road list.

Next, the temporarily registered road is deleted from the temporarily registered road list (step ST72). More specifically, the temporary registration unit 23 deletes the temporarily registered road that matches the traveling locus data generated by the traveling locus data generation unit 21 from the temporarily registered road list. Next, addition processing using the averaged traveling locus is performed (step ST73). More specifically, the temporary registration unit 23 registers the traveling locus data generated in the step ST71 in the temporarily registered road list as a temporarily registered road. The traveling locus shape correction processing is then completed.

As described above, in accordance with the map information processing apparatus of the second embodiment of this invention, the traveling locus data of a temporarily registered road registered in the temporarily registered road list are corrected using traveling locus data generated by the traveling locus data generation unit during actual travel on an actual temporarily registered road, and therefore road data including traveling locus data having a closer shape to the actual road shape can be obtained.

Third Embodiment

In a map information processing apparatus in accordance with a third embodiment of this invention, when the vehicle is traveling on a road that has already been temporarily registered, the road is registered as a temporarily registered road relating to an identical road, and one temporarily registered road selected by the user from the registered plurality of temporarily registered roads is registered as an officially registered road. The constitution of the map information processing apparatus in accordance with the third embodiment is identical to the constitution of the map information processing apparatus in accordance with the first embodiment, shown in FIG. 1.

Figure 23:
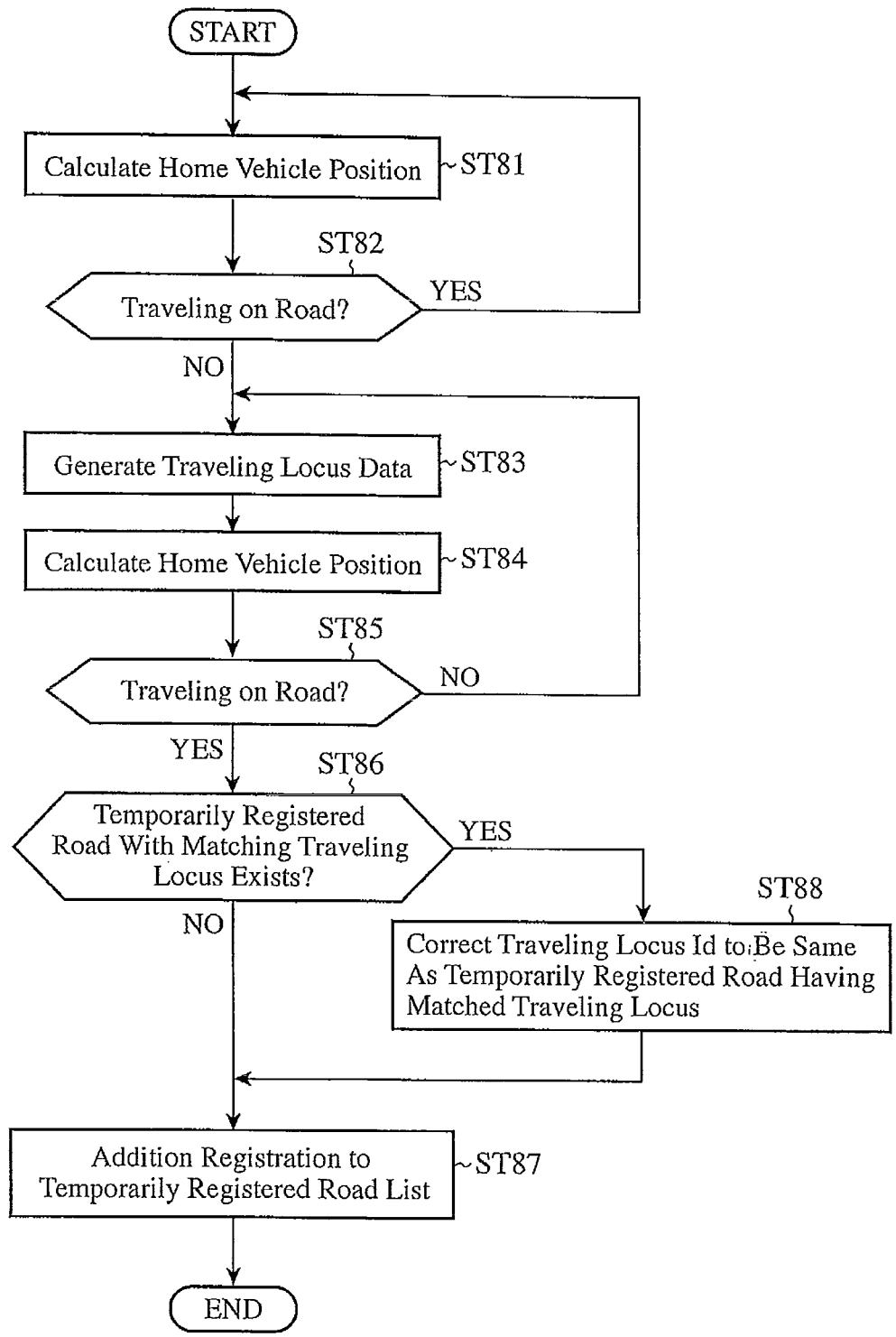
FIG. 23 is a flowchart showing an operation of a map information processing apparatus in accordance with a third embodiment of this invention, centering on temporary registration processing.

An operation of the map information processing apparatus in accordance with the third embodiment will now be described with reference to a flowchart shown in FIG. 23, centering on temporary registration processing. Processing performed in steps ST81 to ST86 of the temporary registration processing is identical to the processing of the steps ST61 to ST66 shown in the flowchart of FIG. 21, which is executed in the map information processing apparatus in accordance with the second embodiment.

When it is determined in the step ST86 that a temporarily registered road having a matching traveling locus does not exist, addition registration to the temporarily registered road list is performed (step S88). More specifically, the traveling locus data generation unit 21 transmits the traveling locus data generated through the processing of the steps ST81 to ST85 to the temporary registration unit 23. The temporary registration unit 23 then adds the traveling locus data received from the traveling locus data generation unit 21 to the temporarily registered road list as a temporarily registered road. The temporary registration processing is then completed.

When it is determined in the step ST86 that a temporarily registered road having a matching traveling locus exists, on the other hand, the traveling locus ID is corrected to be identical to that of the matching temporarily registered road (step ST88). More specifically, the temporary registration unit 23 corrects the traveling locus ID attached to the traveling locus data generated by the traveling locus data generation unit 22 to be identical to the traveling locus ID attached to the traveling locus data of the temporarily registered road having the matching traveling locus in the temporarily registered road list. The sequence then advances to the step ST87, in which addition registration to the temporarily registered road list is performed. The temporary registration processing is then completed.

Figure 24:
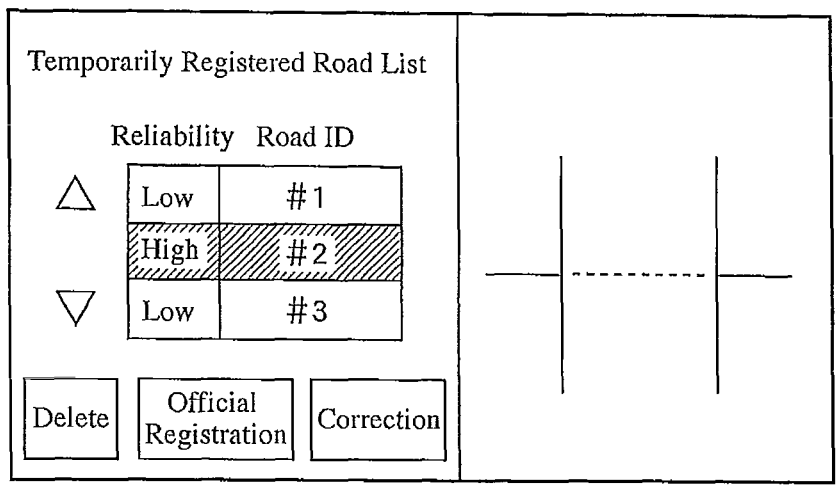
FIG. 24 is a view showing an example of a temporarily registered road list screen displayed by the map information processing apparatus in accordance with the third embodiment of this invention.

FIG. 24 shows an example of a screen of the temporarily registered road list, which is displayed by the map information processing apparatus in accordance with the third embodiment after completion of the temporary registration. The screen shows that a plurality of temporarily registered roads having the same road ID (#2) exist, and that these temporarily registered roads relate to the same road.

Figure 25:
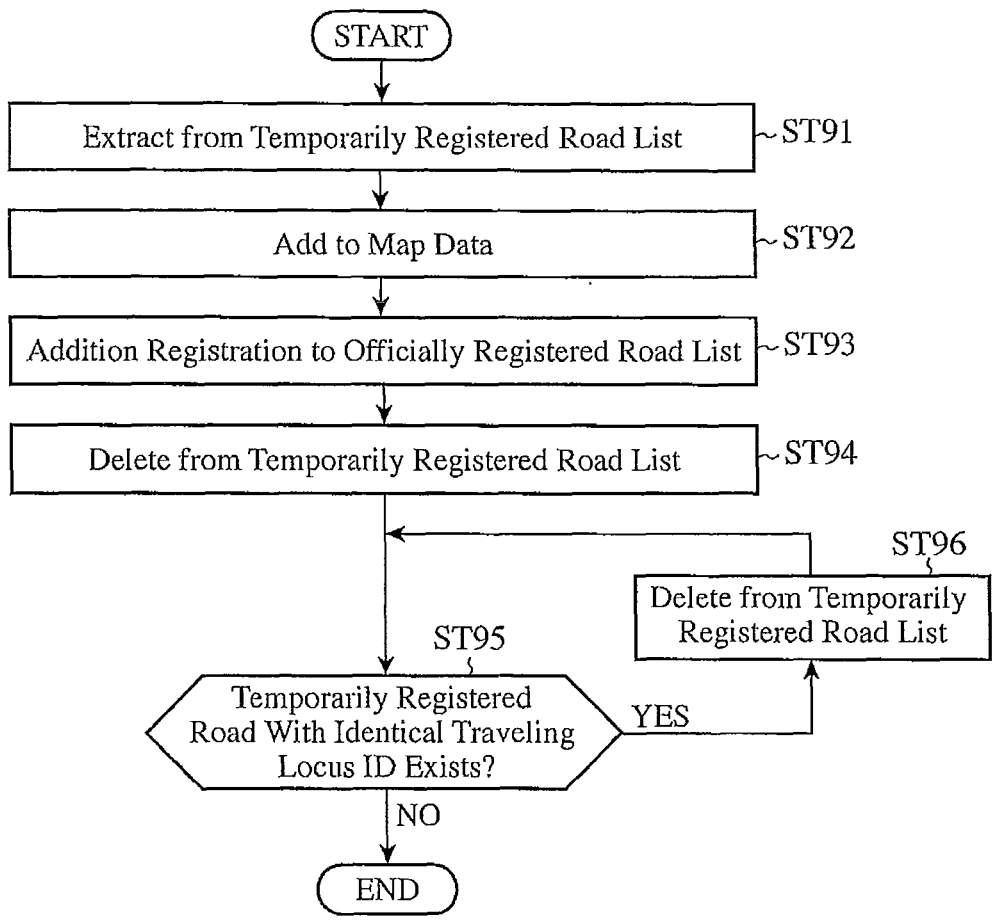
FIG. 25 is a flowchart showing an operation of the map information processing apparatus in accordance with the third embodiment of this invention, centering on official registration processing.

Next, an operation of the map information processing apparatus in accordance with the third embodiment will be described with reference to a flowchart shown in FIG. 25, centering on official registration processing. The official registration processing begins when an "official registration" button is pressed on the temporarily registered road list screen shown in FIG. 24. Processing performed in steps ST91 to ST94 of the official registration processing is identical to the processing of the steps ST21 to ST24 shown in the flowchart of FIG. 13, which is executed in the map information processing apparatus in accordance with the first embodiment.

When a deletion of the temporarily registered road registered as an officially registered road from the temporarily registered road list is completed in the step ST94, a determination is made as to whether or not a plurality of temporarily registered roads having the same traveling locus ID exist (step ST95). More specifically, the temporary registration unit 23 checks whether or not temporarily registered roads having the same traveling locus ID exist in the temporarily registered road list. When it is determined in the step ST95 that a plurality of temporarily registered roads having the same traveling locus ID do not exist, the official registration processing is completed.

When it is determined in the step ST95 that a plurality of temporarily registered roads having the same traveling locus ID exist, on the other hand, a deletion from the temporarily registered road list is performed (step ST96). More specifically, the temporary registration unit 23 deletes an unselected temporarily registered road having the same traveling locus ID as the temporarily registered road registered as an officially registered road in the processing of the steps ST91 to ST94 from the temporarily registered road list. The sequence then returns to the step ST95, in which the processing described above is repeated.

Note that unselected temporarily registered roads having the same road ID as the selected temporarily registered road are also deleted during attribute setting/modification and shape correction, which is executed when the "correction" button is pressed on the temporarily registered road list screen shown in FIG. 24.

As described above, in accordance with the map information processing apparatus of the third embodiment of this invention, a plurality of temporarily registered roads determined to be an identical new road are registered in the temporarily registered road list, one of the plurality of temporarily registered roads is selected by the user during official registration. Therefore, a temporarily registered road having a more correct shape can be added to the map data as the road data of an officially registered road.

Fourth Embodiment

In a map information processing apparatus of a fourth embodiment of this invention, out of temporarily registered roads registered in a temporarily registered road list, the roads having a lapse of at least a fixed time of period are deleted from the list. The constitution of the map information processing apparatus in accordance with the fourth embodiment is identical to the constitution of the map information processing apparatus in accordance with the first embodiment as shown in FIG. 1.

Figure 26:
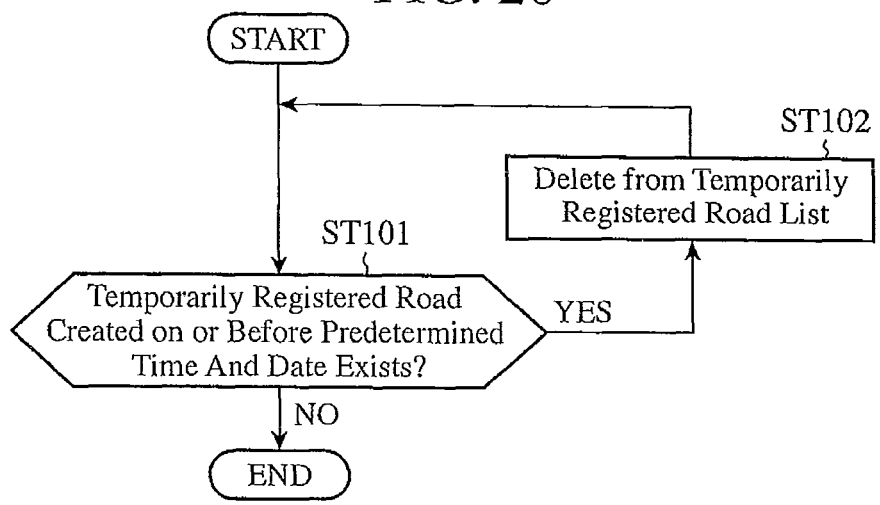
FIG. 26 is a flowchart showing an operation of a map information processing apparatus in accordance with a fourth embodiment of this invention, centering on temporarily registered road deletion processing.

Next, an operation of the map information processing apparatus in accordance with the fourth embodiment will be described with reference to a flowchart shown in FIG. 26, centering on temporarily registered road deletion processing.

In the temporarily registered road deletion processing, first, a determination is made as to whether or not a temporarily registered road created on or before a predetermined time and date exists (step ST101). More specifically, the temporary registration unit 23 determines whether or not a temporarily registered road in which the creation time, included in the traveling locus data on one temporarily registered road, is on or before a predetermined time and date exists in the temporarily registered road list.

When it is determined in the step ST101 that a temporarily registered road created on or before the predetermined time and date exists, a deletion from the temporarily registered road list is performed (step ST102). More specifically, the temporary registration unit 23 deletes one temporarily registered road created before the predetermined time and date from the temporarily registered road list. The sequence then returns to the step ST101, in which the processing described above is repeated. When it is determined in the step ST101 that a temporarily registered road created on or before the predetermined time and date does not exist, on the other hand, the temporarily registered road deletion processing is completed.

As described above, in accordance with the map information processing apparatus of the fourth embodiment of this invention, temporarily registered roads created on or before the predetermined time and date are deleted from the temporarily registered roads registered in the temporarily registered road list, and therefore, when official registration is not performed within a fixed time period following temporary registration, the corresponding temporarily registered road is deleted. As a result, temporarily registered roads that are unlikely to be correct new roads are deleted, and therefore meaningless temporarily registered roads are eliminated.

Note that in the map information processing apparatus in accordance with the fourth embodiment, a temporarily registered road created on or before the predetermined time and date is deleted automatically from the temporarily registered roads registered in the temporarily registered road list. However, permission to delete may be requested of the user prior to deletion such that the temporarily registered road is deleted only when permission to delete is granted in response to this request. According to this constitution, an erroneous deletion of a temporarily registered road corresponding to a correct new road can be prevented.

Fifth Embodiment

In a map information processing apparatus in accordance with a fifth embodiment of this invention, a temporarily registered road registered in the temporarily registered road list is deleted when a predetermined event occurs. The constitution of the map information processing apparatus in accordance with the fifth embodiment is identical to the constitution of the map information processing apparatus in accordance with the first embodiment, shown in FIG. 1.

Figure 27:
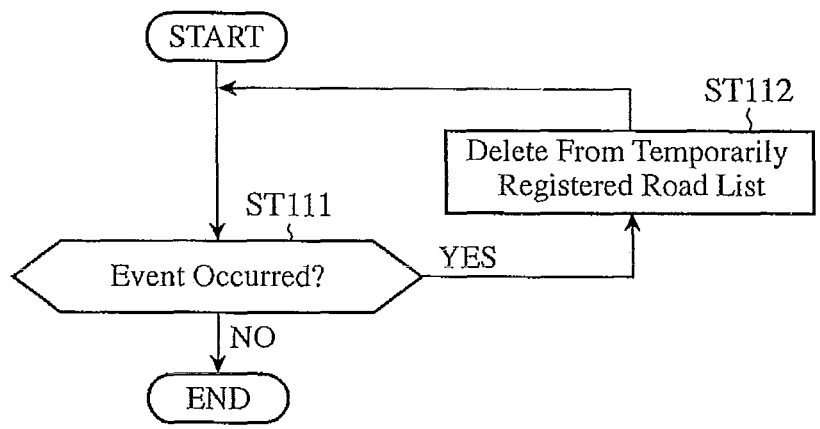
FIG. 27 is a flowchart showing an operation of a map information processing apparatus in accordance with a fifth embodiment of this invention, centering on temporarily registered road deletion processing.

Next, an operation of the map information processing apparatus in accordance with the fifth embodiment will be described with reference to a flowchart shown in FIG. 27, centering on temporarily registered road deletion processing. In this temporarily registered road deletion processing, first, a determination is made as to whether or not an event has occurred (step ST111). More specifically, the temporary registration unit 23 determines whether or not an event such as arrival at the set destination or engine OFF-ON, for example, has occurred.

When it is determined in the step ST111 that an event has occurred, a full deletion from the temporarily registered road is performed (step ST112). More specifically, the temporary registration unit 23 deletes all of the temporarily registered roads registered in the temporarily registered road list. The temporarily registered road deletion processing is then completed. When it is determined in the step ST111 that an event has not occurred, on the other hand, the temporarily registered road deletion processing is completed without deleting the temporarily registered roads.

As described above, in accordance with the map information processing apparatus of the fifth embodiment of this invention, all of the temporarily registered roads registered in the temporarily registered road list are deleted when a predetermined event occurs, and therefore temporarily registered roads that are unlikely to be correct new roads are deleted. As a result, meaningless temporarily registered roads are eliminated.

Note that in the map information processing apparatus in accordance with the fifth embodiment, all of the temporarily registered roads registered in the temporarily registered road list are deleted automatically when a predetermined event occurs. However, permission to delete may be requested of the user prior to deletion such that the temporarily registered roads are deleted only when permission to delete is granted in response to this request. According to this constitution, an erroneous deletion of a temporarily registered road corresponding to a correct new road can be prevented.

Sixth Embodiment

In a map information processing apparatus in accordance with a sixth embodiment of this invention, an oldest temporarily registered road is deleted when the number of temporarily registered roads registered in the temporarily registered road list reaches an upper limit of a number (manageable number) of temporarily registered roads that can be managed in the temporarily registered road list. The constitution of the map information processing apparatus in accordance with the sixth embodiment is identical to the constitution of the map information processing apparatus in accordance with the first embodiment, shown in FIG. 1.

Figure 28:
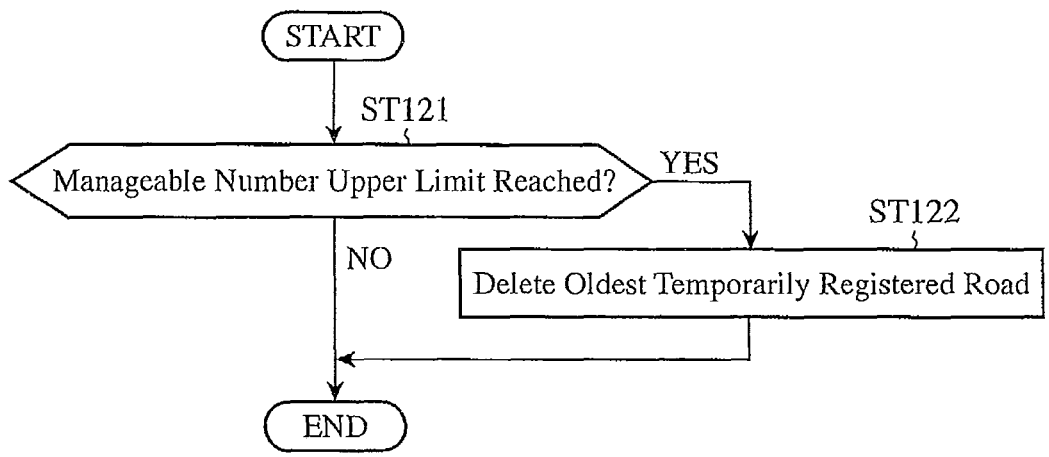
FIG. 28 is a flowchart showing an operation of a map information processing apparatus in accordance with a sixth embodiment of this invention, centering on temporarily registered road deletion processing.

Next, an operation of the map information processing apparatus in accordance with the sixth embodiment will be described with reference to a flowchart shown in FIG. 28, centering on temporarily registered road deletion processing. In this temporarily registered road deletion processing, first, a determination is made as to whether or not the upper limit of the manageable number has been reached (step ST121). More specifically, the temporary registration unit 23 determines whether or not the number of temporarily registered roads registered in the temporarily registered road list has reached the upper limit of the number (manageable number) of temporarily registered roads that can be managed in the temporarily registered road list.

When it is determined in the step ST121 that the upper limit of the manageable number has been reached, the oldest temporarily registered road is deleted (step ST122). More specifically, the temporary registration unit 23 checks the creation times included in the traveling locus data of the temporarily registered roads registered in the temporarily registered road list, and deletes the temporarily registered road having the oldest creation time. The temporarily registered road deletion processing is then completed. When it is determined in the step ST121 that the upper limit of the manageable number has not been reached, on the other hand, the temporarily registered road deletion processing is completed without performing temporarily registered road deletion.

As described above, in accordance with the map information processing apparatus of the sixth embodiment of this invention, the oldest of the temporarily registered roads registered in the temporarily registered road list is deleted when the upper limit of the manageable number is reached, and therefore temporarily registered roads that are unlikely to be correct new roads are deleted. As a result, meaningless temporarily registered roads are eliminated.

Note that in the map information processing apparatus in accordance with the sixth embodiment, the oldest of the temporarily registered roads registered in the temporarily registered road list is deleted automatically when the number of temporarily registered roads reaches the upper limit of the manageable number. However, permission to delete may be requested from the user prior to deletion such that the temporarily registered roads are deleted only when permission to delete is granted from the user in response to this request. According to this constitution, erroneous deletion of a temporarily registered road corresponding to a correct new road can be prevented.

Seventh Embodiment

In a map information processing apparatus in accordance with a seventh embodiment of this invention, an area in which temporary registration has been performed erroneously even though a road does not actually exist in the area is set as an area in which temporary registration is prohibited (also referred to hereafter as a "temporary registration prohibited area"), thereby preventing erroneous registration. The constitution of the map information processing apparatus in accordance with the seventh embodiment is identical to the constitution of the map information processing apparatus in accordance with the first embodiment, shown in FIG. 1.

Figure 29:
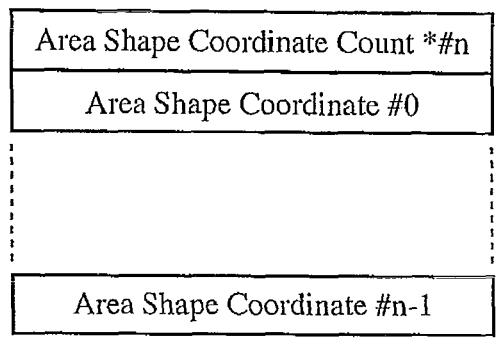
FIG. 29 is a view showing a format of temporary registration prohibited area data used by a map information processing apparatus in accordance with a seventh embodiment of this invention.
Figure 30:
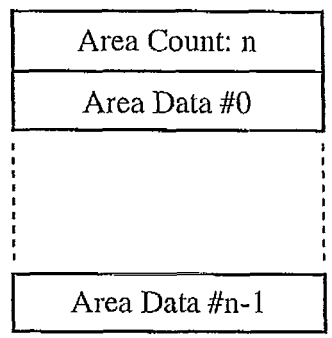
FIG. 30 is a view showing a format of a temporary registration prohibited area list on which the temporary registration prohibited area data shown in FIG. 29 are provided in a list format.

FIG. 29 is a view showing a format of temporary registration prohibited area data used by the map information processing apparatus in accordance with the seventh embodiment. The temporary registration prohibited area data are constituted by an area shape coordinate count (*#n) and area shape coordinates #0 to #n−1. FIG. 30 is a view showing a format of a temporary registration prohibited area list showing the temporary registration prohibited area data of FIG. 29 in a list format.

Figure 31:
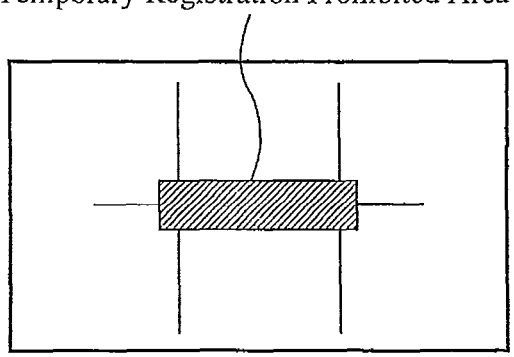
FIG. 31 is a view showing an example in which a temporary registration prohibited area is displayed on a map in the map information processing apparatus in accordance with the seventh embodiment of this invention.

A temporary registration prohibited area can be set using a touch panel provided on the screen of the display unit 14 as the operation unit 11, for example. In this case, the set temporary registration prohibited area can be displayed on the map, as shown in FIG. 31.

Figure 32:
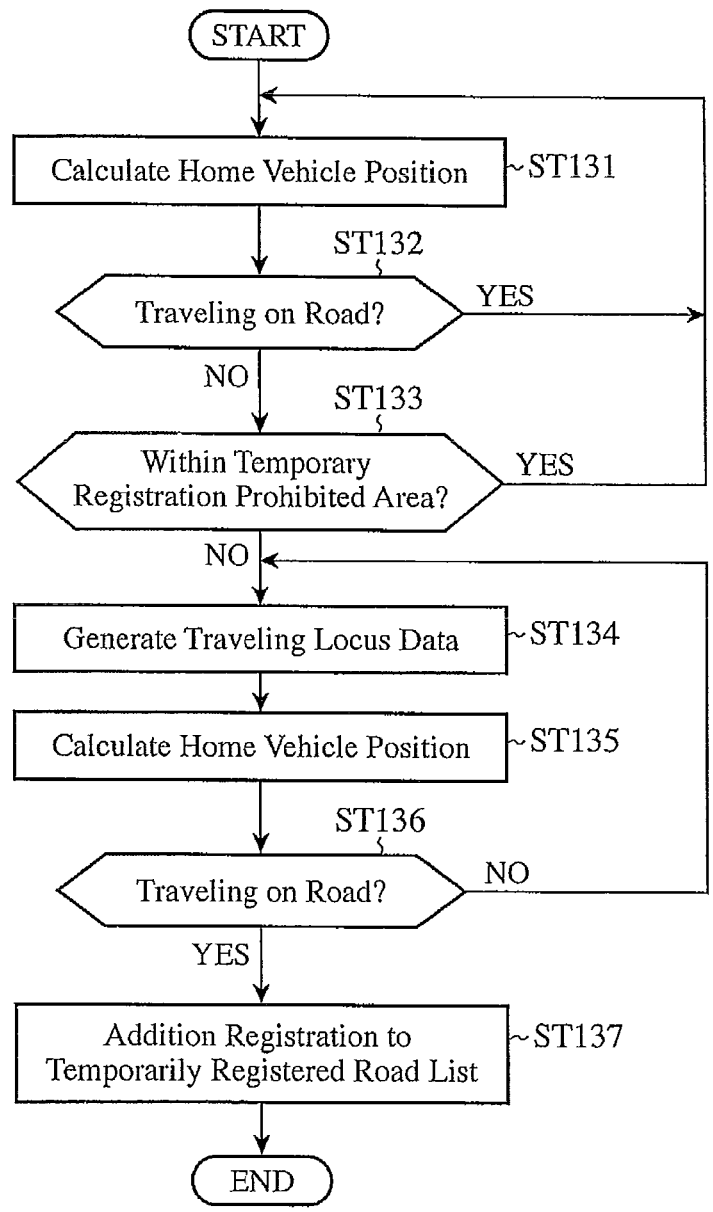
FIG. 32 is a flowchart showing an operation of the map information processing apparatus in accordance with the seventh embodiment of this invention, centering on temporary registration processing.

Next, an operation of the map information processing apparatus in accordance with the seventh embodiment will be described with reference to a flowchart shown in FIG. 32, centering on temporary registration processing when a temporary registration prohibited area has been set. In the temporary registration processing, first, the vehicle position is calculated (step ST131). Next, a determination is made as to whether or not the vehicle is traveling on a road (step ST132). When it is determined in the step ST132 that the vehicle is traveling on a road, the sequence returns to the step ST131, where the processing described above is repeated. The processing performed in the steps ST131 and ST132 is identical to the processing performed in the steps ST11 and ST12 shown in the flowchart of FIG. 12.

When it is determined in the step ST132 that the vehicle is not traveling on a road, a condition in which travel on a new road has begun is acknowledged, whereupon a determination is made as to whether or not the vehicle is located within a temporary registration prohibited area (step ST133). More specifically, the traveling locus data generation unit 21 determines whether or not the vehicle position indicated by the vehicle position data transmitted from the vehicle position calculation unit 12 is within a temporary registration prohibited area. When it is determined in the step ST133 that the vehicle is located within a temporary registration prohibited area, the sequence returns to the step ST131, where the processing described above is repeated.

When it is determined in the step ST133 that the vehicle is not located within a temporary registration prohibited area, on the other hand, traveling locus data are generated (step ST134). Next, the vehicle position is calculated (step ST135). Next, a determination is made as to whether or not the vehicle is traveling on a road (step ST136). When it is determined in the step ST136 that the vehicle is not traveling on a road, or in other words that the vehicle has not returned to an existing road, the sequence returns to the step ST134, where the processing described above is repeated. When it is determined in the step ST136 that the vehicle is traveling on a road, on the other hand, a condition in which the vehicle has returned to an existing road existing in the map data from a new road is acknowledged, and addition registration to the temporarily registered road list is performed (step S137). The processing performed in the steps ST134 to ST137 is identical to the processing performed in the steps ST13 to ST16 shown in the flowchart of FIG. 12. The temporary registration processing is then completed.

As described above, in accordance with the map information processing apparatus of the seventh embodiment of this invention, traveling locus data are not generated in relation to a temporary registration prohibited area, and therefore temporary registration of incorrect new roads can be eliminated and situations in which correct new roads are not registered can be prevented.

Eighth Embodiment

A map information processing apparatus in accordance with an eighth embodiment of this invention differs from the map information processing apparatus in accordance with the seventh embodiment in that the area in which temporary registration is prohibited is set by specifying a temporarily registered road. The constitution of the map information processing apparatus in accordance with the eighth embodiment is identical to the constitution of the map information processing apparatus in accordance with the first embodiment, shown in FIG. 1.

FIG. 33 shows an example of a temporarily registered road list screen used by the map information processing apparatus in accordance with the eighth embodiment, in which a "set area" button is added to the temporarily registered road list screen used by the map information processing apparatus in accordance with the first embodiment, shown in FIG. 10. By pressing the "set area" button while a single temporarily registered road is selected, a temporary registration prohibited area is set. For example, when the "set area" button is pressed while the temporarily registered road shown by a broken line in FIG. 34 is selected, a temporary registration prohibited area such as that shown in FIG. 35 is set.

Figure 36:
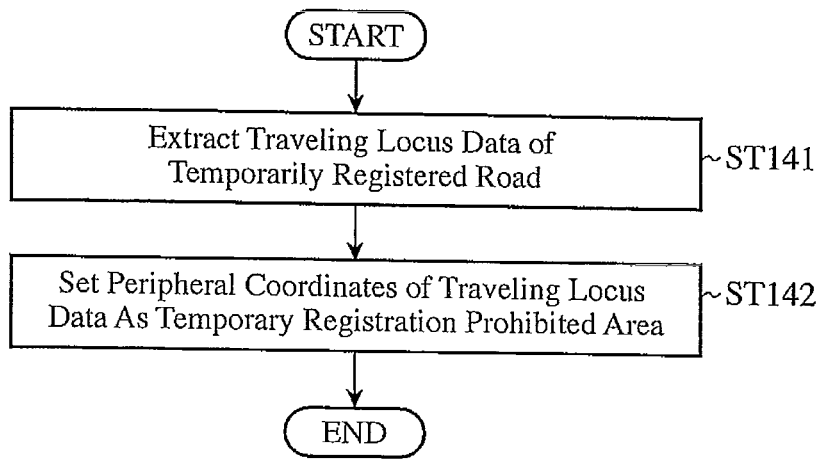
FIG. 36 is a flowchart showing an operation of the map information processing apparatus in accordance with the eighth embodiment of this invention, centering on temporary registration prohibited area setting processing.

Next, an operation of the map information processing apparatus in accordance with the eighth embodiment will be described with reference to a flowchart shown in FIG. 36, centering on temporary registration prohibited area setting processing. When the "set area" button is pressed on the temporarily registered road list screen, the temporary registration prohibited area setting processing begins. In the temporary registration prohibited area setting processing, first, the traveling locus data of the temporarily registered road selected at that time are extracted (step ST141). More specifically, the temporary registration unit 23 extracts the traveling locus data relating to the selected temporarily registered road, and transmits the extracted traveling locus data to the traveling locus data generation unit 21.

Next, peripheral coordinates of the traveling locus data are set as a temporary registration prohibited area (step ST142). More specifically, the traveling locus data generation unit 21 sets a predetermined range on the periphery of the traveling locus coordinates included in the traveling locus data of the temporarily registered road, received from the temporary registration unit 23 in the step ST141, as a temporary registration prohibited area. The temporary registration prohibited area setting processing is then completed.

As described above, in accordance with the map information processing apparatus of the eighth embodiment of this invention, the temporary registration prohibited area is set by selecting a temporarily registered road, and therefore an area in which temporary registration is prohibited can be set effectively.

Ninth Embodiment

A map information processing apparatus in accordance with a ninth embodiment of this invention differs from the map information processing apparatus in accordance with the seventh embodiment in that the area in which temporary registration is prohibited is set during temporarily registered road deletion. The constitution of the map information processing apparatus in accordance with the ninth embodiment is identical to the constitution of the map information processing apparatus in accordance with the first embodiment, shown in FIG. 1.

Figure 37:
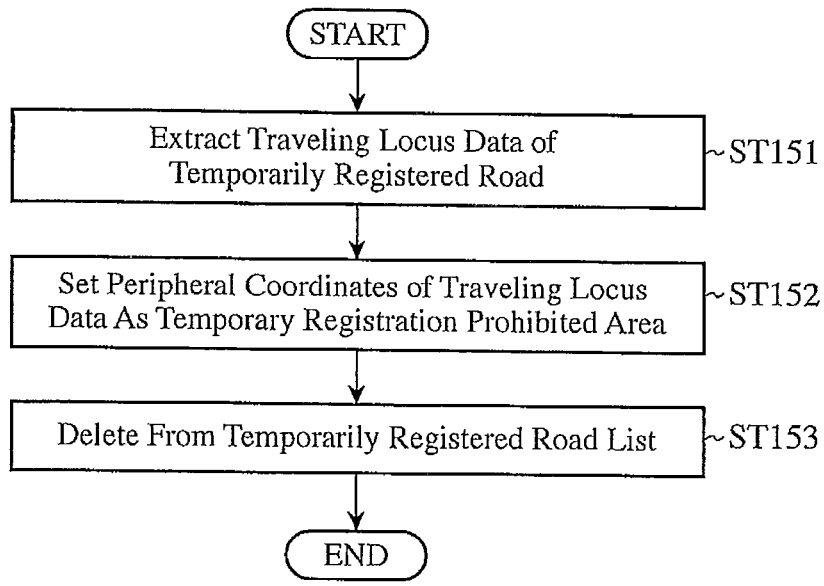
FIG. 37 is a flowchart showing an operation of a map information processing apparatus in accordance with a ninth embodiment of this invention, centering on temporary registration prohibited area setting processing.

Next, an operation of the map information processing apparatus in accordance with the ninth embodiment will be described with reference to a flowchart shown in FIG. 37, centering on temporary registration prohibited area setting processing. When the "set area" button is pressed on the temporarily registered road list screen, the temporary registration prohibited area setting processing begins. In the temporary registration prohibited area setting processing, first, the traveling locus data of the temporarily registered road selected at that moment are extracted (step ST151). More specifically, the temporary registration unit 23 extracts the traveling locus data relating to the selected temporarily registered road, and transmits the extracted traveling locus data to the traveling locus data generation unit 21.

Next, peripheral coordinates of the traveling locus data are set as a temporary registration prohibited area (step ST152). More specifically, the traveling locus data generation unit 21 sets a predetermined range on the periphery of the traveling locus coordinates included in the traveling locus data of the temporarily registered road, received from the temporary registration unit 23 in the step ST151, as a temporary registration prohibited area. Next, deletion processing from the temporarily registered road list is performed (step ST153). More specifically, the temporary registration unit 23 deletes the selected temporarily registered road from the temporarily registered road list. The temporary registration prohibited area setting processing is then completed.

As described above, in accordance with the map information processing apparatus of the ninth embodiment of this invention, the temporary registration prohibited area is set during temporarily registered road deletion, and therefore an area in which temporary registration is prohibited can be set effectively unbeknownst to the user.

Tenth Embodiment

A map information processing apparatus in accordance with a tenth embodiment of this invention differs from the map information processing apparatus in accordance with the seventh embodiment in that the area in which temporary registration is prohibited is set during officially registered road deletion. The constitution of the map information processing apparatus in accordance with the tenth embodiment is identical to the constitution of the map information processing apparatus in accordance with the first embodiment, shown in FIG. 1.

Although not shown in the drawings, in the map information processing apparatus in accordance with the tenth embodiment, a temporary registration prohibited area is set when the "delete" button on the officially registered road list screen shown in FIG. 11 is pressed while a single officially registered road is selected.

Figure 38:
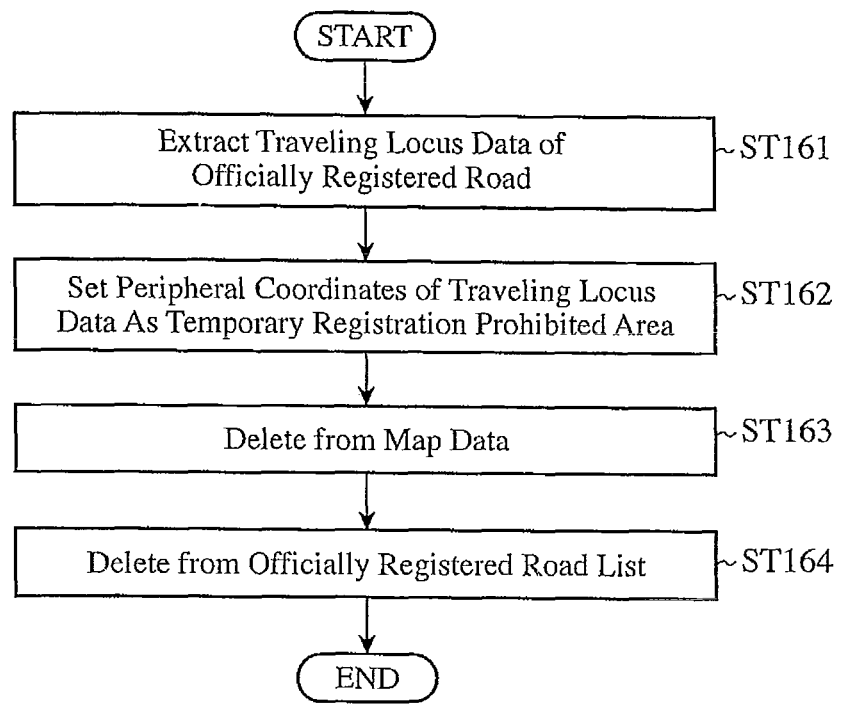
FIG. 38 is a flowchart showing an operation of a map information processing apparatus in accordance with a tenth embodiment of this invention, centering on temporary registration prohibited area setting processing.

Next, an operation of the map information processing apparatus in accordance with the tenth embodiment will be described with reference to a flowchart shown in FIG. 38, centering on temporary registration prohibited area setting processing. When the "delete" button is pressed on the officially registered road list screen, the temporary registration prohibited area setting processing begins. In the temporary registration prohibited area setting processing, first, the traveling locus data of the officially registered road selected at that time are extracted (step ST161). More specifically, the official registration unit 24 extracts the traveling locus data relating to the selected officially registered road, and transmits the extracted traveling locus data to the traveling locus data generation unit 21.

Next, peripheral coordinates of the traveling locus data are set as a temporary registration prohibited area (step ST162). More specifically, the traveling locus data generation unit 21 sets a predetermined range on the periphery of the traveling locus coordinates included in the traveling locus data of the officially registered road, received from the official registration unit 24 in the step ST161, as a temporary registration prohibited area. Next, deletion processing from the map data is performed (step ST163). More specifically, the official registration unit 24 deletes the road data corresponding to the officially registered road extracted in the step ST161 from the map data stored in the map data storage unit 1. Next, deletion processing from the officially registered road list is performed (step ST164). More specifically, the official registration unit 24 deletes the selected officially registered road from the officially registered road list. The temporary registration prohibited area setting processing is then completed.

As described above, in accordance with the map information processing apparatus of the tenth embodiment of this invention, the temporary registration prohibited area is set during officially registered road deletion, and therefore an area in which temporary registration is prohibited can be set effectively unbeknownst to the user.

Eleventh Embodiment

A map information processing apparatus in accordance with an eleventh embodiment of this invention differs from the map information processing apparatuses in accordance with the seventh to tenth embodiments in that a temporary registration prohibited area setting can be canceled. The constitution of the map information processing apparatus in accordance with the eleventh embodiment is identical to the constitution of the map information processing apparatus in accordance with the first embodiment, shown in FIG. 1.

Figure 39:
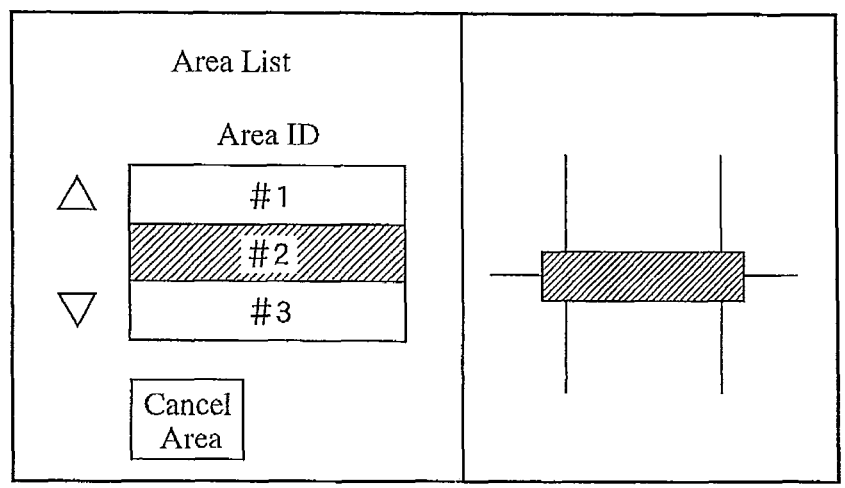
FIG. 39 is a view showing an example of a temporary registration prohibited area list screen used by the map information processing apparatus in accordance with the tenth embodiment of this invention.

FIG. 39 shows an example of a screen of a temporary registration prohibited area list used by the map information processing apparatus in accordance with the eleventh embodiment. On the temporary registration prohibited area list screen, temporary registration prohibited areas are shown on the left half of the screen by area IDs. An area (indicated by shading) selected from the temporary registration prohibited area list and existing roads to which the area is connected are displayed on the right half of the screen. Further, a "cancel area" button is provided on the left half of the temporary registration prohibited area list screen. When the "cancel area" button is pressed on the temporary registration prohibited area list screen, the setting of the temporary registration prohibited area displayed at that moment is canceled.

As described above, in accordance with the map information processing apparatus of the eleventh embodiment of this invention, the setting of a temporary registration prohibited area can be canceled, and therefore a temporarily registered road existing in the canceled area can be re-registered in the temporarily registered road list. As a result, it is possible to deal with a case in which an area is set erroneously, a case in which a new road is opened after area setting, and so on.

Twelfth Embodiment

A map information processing apparatus in accordance with a twelfth embodiment of this invention updates the map data periodically after an officially registered road is returned to a temporarily registered road. The constitution of the map information processing apparatus in accordance with the twelfth embodiment is identical to the constitution of the map information processing apparatus in accordance with the first embodiment, shown in FIG. 1.

In a conventional navigation apparatus, update data issued once or twice a year are applied to map data stored on an HDD (Hard Disk Drive), whereby old map data are updated to new map data. In the map information processing apparatus in accordance with the twelfth embodiment, the map data updating unit 6 updates the map data stored in the map data storage unit 1 after an officially registered road is returned to the temporarily registered road list as a temporarily registered road by the official registration unit 24.

As described above, in accordance with the map information processing apparatus of the twelfth embodiment of this invention, the map data are updated after an officially registered road is returned to a temporarily registered road, and therefore new roads can be introduced through an update using update data rather than by adding a new road to the map data as an officially registered road. As a result, more accurate map data can be obtained.

Thirteenth Embodiment

In a map information processing apparatus in accordance with a thirteenth embodiment of this invention, the map data are updated periodically after an officially registered road has been returned to a temporarily registered road, and even after the map data have been updated, a temporarily registered road determined to be a new road is added to the map data as an officially registered road. The constitution of the map information processing apparatus in accordance with the thirteenth embodiment is identical to the constitution of the map information processing apparatus in accordance with the first embodiment, shown in FIG. 1.

Figure 40:
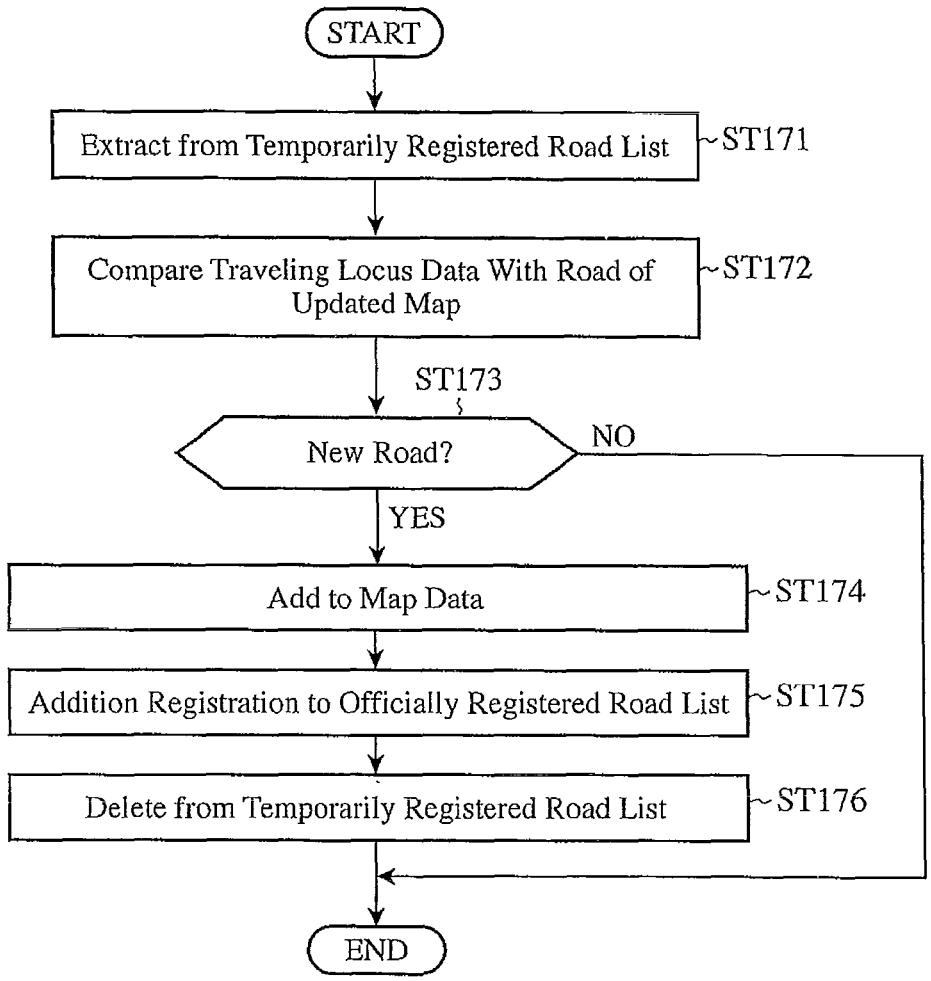
FIG. 40 is a flowchart showing an operation of a map information processing apparatus in accordance with a thirteenth embodiment of this invention, centering on official registration processing.

Next, an operation of the map information processing apparatus in accordance with the thirteenth embodiment will be described with reference to a flowchart shown in FIG. 40, centering on official registration processing. In this official registration processing, first, a temporarily registered road is extracted from the temporarily registered road list (step ST171). More specifically, the temporary registration unit 23 extracts a temporarily registered road selected from the temporarily registered road list, and transmits the extracted temporarily registered road to the official registration unit 24.

Next, processing for comparing traveling locus data with a road on an updated map is performed (step ST172). More specifically, the official registration unit 24 compares the traveling locus data of the temporarily registered road received from the temporary registration unit 23 with the traveling locus data of the corresponding road data included in the updated map data stored in the map data storage unit 1. Next, a determination is made as to whether or not the temporarily registered road is a new road (step ST173). More specifically, the official registration unit 24 determines whether or not a comparison result obtained in the step ST172 indicates that they are identical roads. When it is determined in the step ST173 that the temporarily registered road is not a new road, the official registration processing is completed.

When it is determined in the step ST173 that the temporarily registered road is a new road, addition to the map data is performed (step ST174). More specifically, the official registration unit 24 generates road data on the basis of the traveling locus data of the temporarily registered road received from the temporary registration unit 23, and transmits the generated traveling locus data to the map data storage unit 1. Thus, the road data are added to the map data in the map data storage unit 1.

Next, addition registration in the officially registered road list is performed (step ST175). More specifically, the official registration unit 24 adds the temporarily registered road received from the temporary registration unit 23 to the officially registered road list as an officially registered road. Next, the temporarily registered road registered as an officially registered road is deleted from the temporarily registered road list (step ST176). More specifically, the temporary registration unit 23 deletes the temporarily registered road transmitted to the official registration unit 24 from the temporarily registered road list. The official registration processing is then completed.

As described above, in accordance with the map information processing apparatus of the thirteenth embodiment of this invention, the map data are updated periodically after an officially registered road is returned to a temporarily registered road, and even after the map data have been updated, if there are temporarily registered roads determined as new roads, they are to be added to the map data as officially registered roads. Hence, roads not included in the updated map data are added to the map data automatically. As a result, previously registered officially registered roads can be used as is even after a periodic update of the map data.

Fourteenth Embodiment

In a map information processing apparatus in accordance with a fourteenth embodiment of this invention, the map data are updated periodically after an officially registered road is returned to a temporarily registered road, and a road that does not exist in the updated map data is presented to the user as an official registration candidate. The constitution of the map information processing apparatus in accordance with the fourteenth embodiment is identical to the constitution of the map information processing apparatus in accordance with the first embodiment, shown in FIG. 1.

Figure 41:
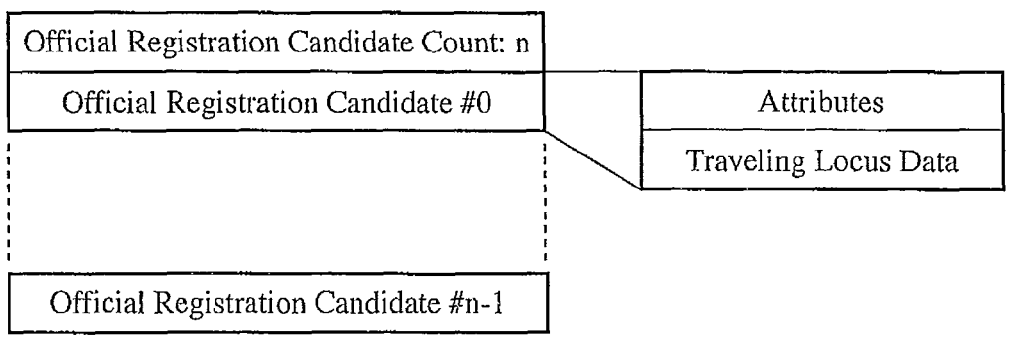
FIG. 41 is a view showing the constitution of an official registration candidate list used by a map information processing apparatus in accordance with a fourteenth embodiment of this invention.

FIG. 41 is a view showing the constitution of an official registration candidate list used by the map information processing apparatus in accordance with the fourteenth embodiment. The official registration candidate list is provided in the official registration unit 24 and constituted by an official registration candidate count (n) and official registration candidates #0 to #n−1. Each official registration candidate is constituted by attributes and traveling locus data.

Figure 42:
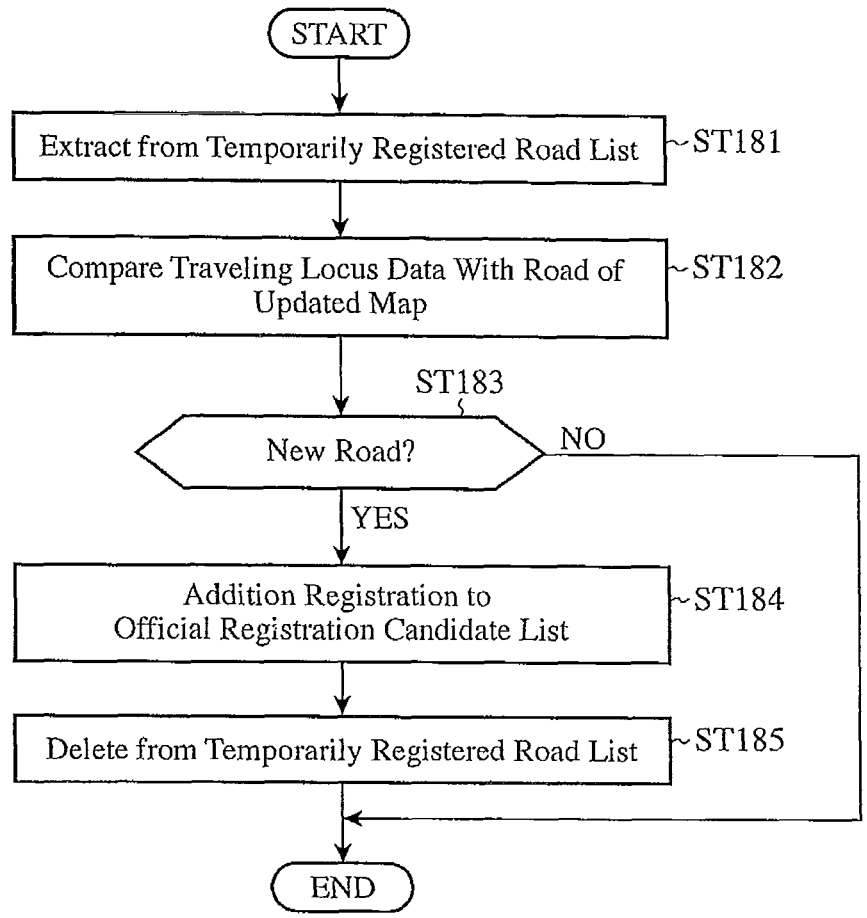
FIG. 42 is a flowchart showing an operation of the map information processing apparatus in accordance with the fourteenth embodiment of this invention, centering on official registration candidate addition processing.

Next, an operation of the map information processing apparatus in accordance with the fourteenth embodiment will be described with reference to a flowchart shown in FIG. 42, centering on official registration candidate addition processing. In the official registration candidate addition processing, first, a temporarily registered road is extracted from the temporarily registered road list (step ST181). More specifically, the temporary registration unit 23 extracts a temporarily registered road selected from the temporarily registered road list, and transmits the extracted temporarily registered road to the official registration unit 24.

Next, processing for comparing traveling locus data with a road on an updated map is performed (step ST182). More specifically, the official registration unit 24 compares the traveling locus data of the temporarily registered road received from the temporary registration unit 23 with the traveling locus data of the corresponding road data included in the updated map data stored in the map data storage unit 1. Next, a determination is made as to whether or not the temporarily registered road is a new road (step ST183). More specifically, the official registration unit 24 determines whether or not a comparison result obtained in the step ST182 indicates that they are identical roads. When it is determined in the step ST183 that the temporarily registered road is not a new road, the official registration candidate addition processing is completed.

When it is determined in the step ST183 that the temporarily registered road is a new road, addition to the official registration candidate list is performed (step ST184). More specifically, the official registration unit 24 adds the temporarily registered road received from the temporary registration unit 23 to the official registration candidate list. Next, the temporarily registered road registered in the official registration candidate list as an official registration candidate is deleted from the temporarily registered road list (step ST185). More specifically, the temporary registration unit 23 deletes the temporarily registered road transmitted to the official registration unit 24 from the temporarily registered road list. The official registration candidate addition processing is then completed.

Figure 43:
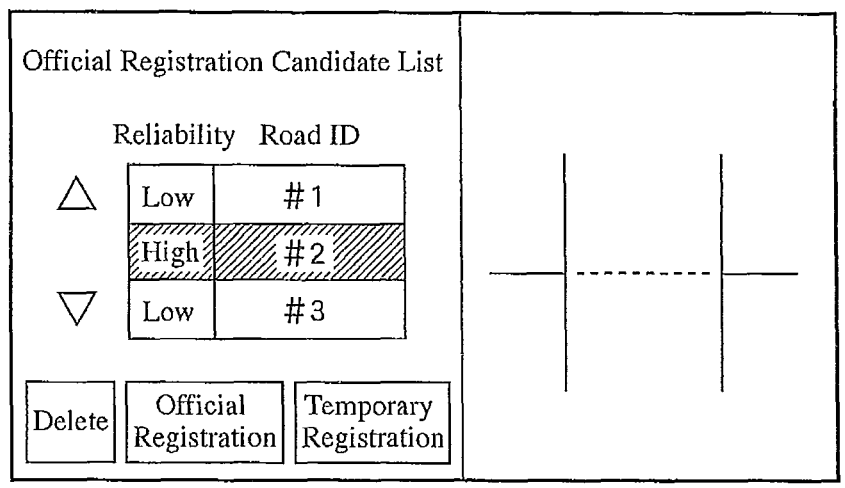
FIG. 43 is a view showing an example of an official registration candidate list screen used by the map information processing apparatus in accordance with the fourteenth embodiment of this invention.

When the processing for adding a temporarily registered road to the official registration candidate list is complete, the user can call up a screen of the official registration candidate list by operating the operation unit 11. FIG. 43 shows an example of the official registration candidate list screen. The officially registered roads registered in the official registration candidate list are indicated on the left half of the official registration candidate list screen by road IDs having an attached reliability value. An official registration candidate (indicated by a broken line) selected from the official registration candidate list and an existing road to which the official registration candidate is connected are displayed on the right half of the official registration candidate list screen. FIG. 43 shows a state in which an official registration candidate having "high" reliability and the road ID #2 has been selected.

Further, a "delete" button, an "official registration" button, and a "correct" button are provided on the left half of the official registration candidate list screen. The "delete" button is used to delete the displayed temporarily registered road from the temporarily registered road list. The "official registration" button is used to register the displayed official registration candidate officially. The "correction" button is used to correct the displayed official registration candidate.

Figure 44:
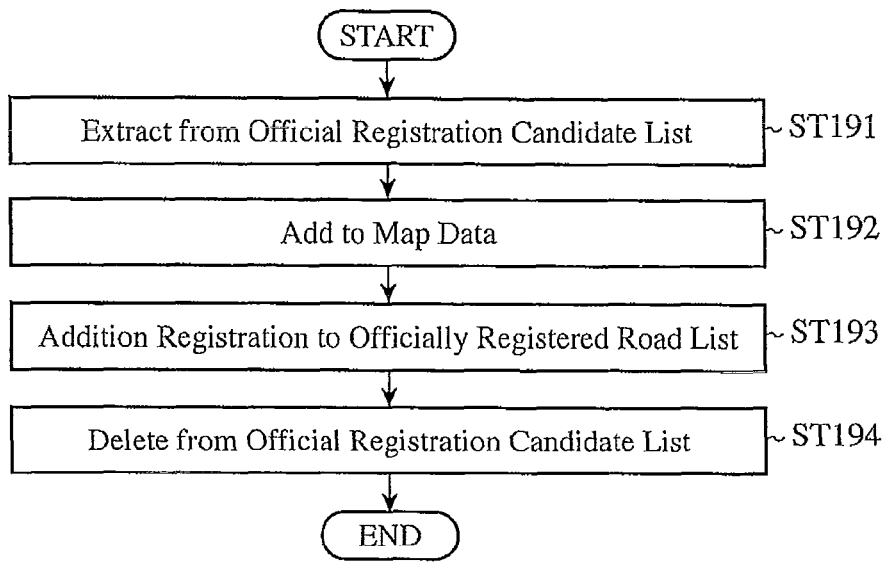
FIG. 44 is a flowchart showing an operation of the map information processing apparatus in accordance with the fourteenth embodiment of this invention, centering on official registration processing.

When the "official registration" button is pressed while a single official registration candidate is selected on the official registration candidate list screen, the selected official registration candidate is registered in the officially registered road list as an officially registered road, and road data corresponding to the registered officially registered road are added to the map data stored in the map data storage unit 1. Official registration processing for registering an official registration candidate as an officially registered road will now be described with reference to a flowchart shown in FIG. 44.

In the official registration processing, first, an official registration candidate is extracted from the official registration candidate list (step ST191). More specifically, the official registration unit 24 extracts an official registration candidate selected from the official registration candidate list. Next, addition to the map data is performed (step ST192). More specifically, the official registration unit 24 generates road data on the basis of traveling locus data relating to the official registration candidate read from the official registration candidate list, and transmits the generated road data to the map data storage unit 1. As a result, the road data are added to the map data in the map data storage unit 1.

Next, addition registration to the officially registered road list is performed (step ST193). More specifically, the official registration unit 24 adds the official registration candidate read from the official registration candidate list to the officially registered road list as an officially registered road. Next, the official registration candidate registered as an officially registered road is deleted from the official registration candidate list (step ST194). More specifically, the official registration unit 24 deletes the official registration candidate read from the official registration candidate list from the official registration candidate list. The official registration processing is then completed.

As described above, in accordance with the map information processing apparatus of the fourteenth embodiment of this invention, a temporarily registered road can be verified as an official registration candidate before being added to the map data as an officially registered road, and therefore erroneous official registration can be prevented.

Fifteenth Embodiment

A map information processing apparatus in accordance with a fifteenth embodiment of this invention officially registers a plurality of temporarily registered roads as a single road. The constitution of the map information processing apparatus in accordance with the fifteenth embodiment is identical to the constitution of the map information processing apparatus in accordance with the first embodiment, shown in FIG. 1.

Figure 45:
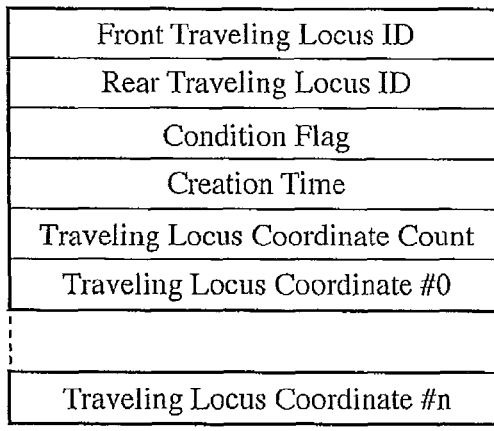
FIG. 45 is a view showing a format of inter-temporarily registered road traveling locus data used by a map information processing apparatus in accordance with a fifteenth embodiment of this invention.
Figure 46:
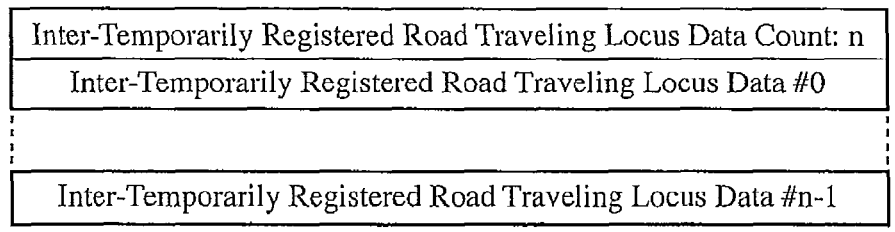
FIG. 46 is a view showing a constitution of an inter-temporarily registered road traveling locus data list used by the map information processing apparatus in accordance with the fifteenth embodiment of this invention.

FIG. 45 is a view showing a format of inter-temporarily registered road traveling locus data used by the map information processing apparatus in accordance with the fifteenth embodiment. The inter-temporarily registered road traveling locus data are constituted by a front traveling locus ID, a rear traveling locus ID, a condition flag, a creation time, a traveling locus coordinate count, and traveling locus coordinates #0 to #n. FIG. 46 is a view showing the constitution of an inter-temporarily registered road traveling locus data list used by the map information processing apparatus in accordance with the fifteenth embodiment. The inter-temporarily registered road traveling locus data list is provided in the temporary registration unit 23, and constituted by an inter-temporarily registered road traveling locus data count (n) and inter-temporarily registered road traveling locus data #0 to #n−1.

Figure 47:
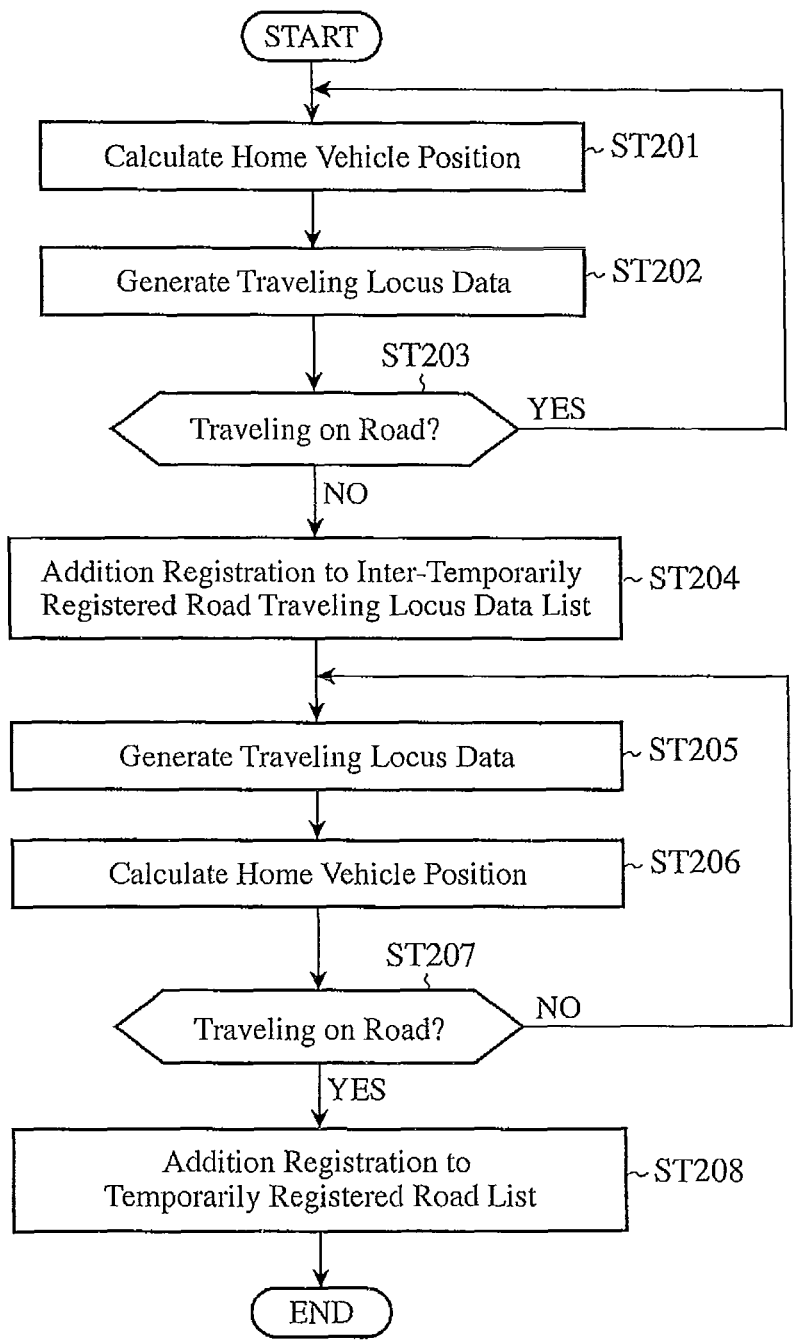
FIG. 47 is a flowchart showing an operation of the map information processing apparatus in accordance with the fifteenth embodiment of this invention, centering on temporary registration processing.

Next, an operation of the map information processing apparatus in accordance with the fifteenth embodiment of this invention, constituted as described above, will be described with reference to a flowchart shown in FIG. 47, centering on temporary registration processing. In the temporary registration processing, first, the vehicle position is calculated (step ST201). Next, the traveling locus data are generated (step ST202). Next, a determination is made as to whether or not the vehicle is traveling on a road (step ST203). The processing of the steps ST201, ST202 and ST203 is identical to the processing of the steps ST11, ST13 and ST12, respectively, shown in the flowchart of FIG. 12.

When it is determined in the step ST203 that the vehicle is traveling on a road, the sequence returns to the step ST201, where the processing described above is repeated. When it is determined in the step ST203 that the vehicle is not traveling on a road, on the other hand, a condition in which the vehicle has deviated from an existing road and begun to travel on a new road is acknowledged, and addition registration processing to the inter-temporarily registered road traveling locus data list is performed (step ST204). More specifically, the temporary registration unit 23 generates inter-temporarily registered road traveling locus data on the basis of the traveling locus data generated in the processing of the steps ST201 to ST203, and then generates an inter-temporarily registered road traveling locus data list.

Next, the vehicle position is calculated (step ST205). Next, the traveling locus data are generated (step ST206). Next, a determination is made as to whether or not the vehicle is traveling on a road (step ST207). The processing of the steps ST205 to ST207 is identical to the processing of the steps ST201 to ST203, described above. When it is determined in the step ST207 that the vehicle is not traveling on a road, the sequence returns to the step ST205, where the processing described above is repeated.

When it is determined in the step ST207 that the vehicle is traveling on a road, on the other hand, a condition in which the vehicle has returned to an existing road existing in the map data from the new road is acknowledged, and addition registration to the temporarily registered road list is performed (step ST208). More specifically, the traveling locus data generation unit 21 transmits the traveling locus data generated in the processing of the steps ST205 to ST207 to the temporary registration unit 23. The temporary registration unit 23 then adds traveling locus data received from the traveling locus data generation unit 21 to the temporarily registered road list as a temporarily registered road. The temporary registration processing is then completed.

Figure 48:
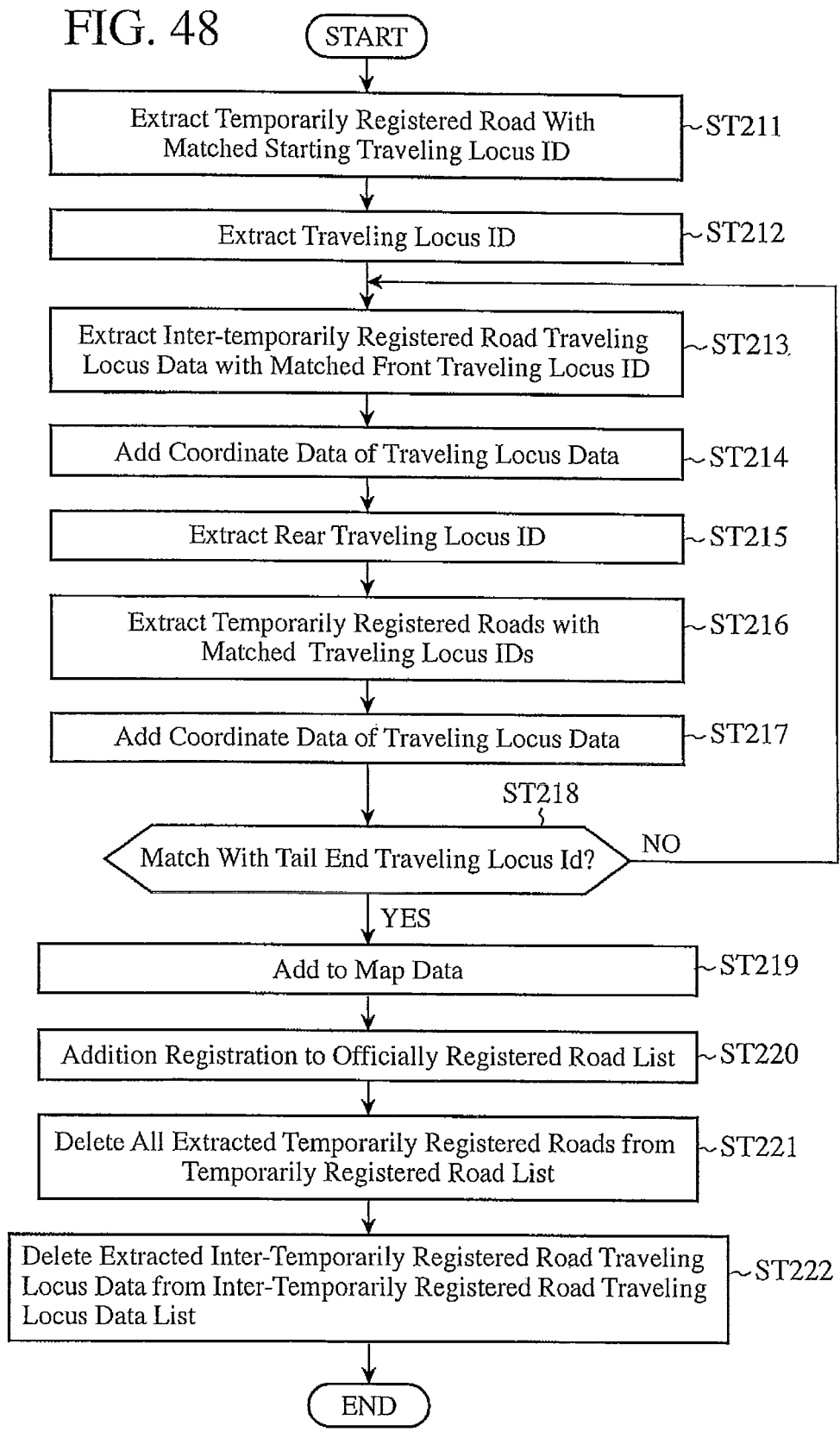
FIG. 48 is a flowchart showing an operation of the map information processing apparatus in accordance with the fifteenth embodiment of this invention, centering on official registration processing.

When temporary registration is complete, the user can call up a screen of the temporarily registered road list such as that shown in FIG. 10, for example, by operating the operation unit 11. When the "official registration" button is pressed on the temporarily registered road list screen, official registration processing for registering a plurality of temporarily registered roads as a single officially registered road is begun. This official registration processing will now be described with reference to a flowchart shown in FIG. 48.

In the official registration processing, first, a temporarily registered road that matches a starting traveling locus ID is extracted (step ST211). More specifically, the temporary registration unit 23 extracts a temporarily registered road that matches the starting traveling locus ID from the temporarily registered road list. Next, a traveling locus ID is extracted (step ST212). More specifically, the temporary registration unit 23 extracts the traveling locus ID of the temporarily registered road extracted in the step ST211.

Next, inter-temporarily registered road traveling locus data having a matching front traveling locus ID are extracted (step ST213). More specifically, the temporary registration unit 23 extracts inter-temporarily registered road traveling locus data having a matching front traveling locus ID from the inter-temporarily registered road traveling locus data list. Next, coordinate data of the traveling locus data are added (step ST214). More specifically, the temporary registration unit 23 adds the traveling locus coordinates included in the inter-temporarily registered road traveling locus data extracted in the step ST213 as traveling locus coordinates of the traveling locus data of an officially registered road.

Next, a rear traveling locus ID is extracted (step ST215). More specifically, the temporary registration unit 23 extracts a rear traveling locus ID from the inter-temporarily registered road traveling locus data extracted in the step ST213. Next, temporarily registered roads having matching traveling locus IDs are extracted (step ST216). More specifically, the temporary registration unit 23 extracts temporarily registered roads having matching traveling locus IDs from the temporarily registered road list.

Next, coordinate data of the traveling locus data are added (step ST217). More specifically, the temporary registration unit 23 adds traveling locus coordinates included in the traveling locus data of the temporarily registered roads extracted in the step ST216 as traveling locus coordinates of the traveling locus data of the officially registered road. Next, a determination is made as to whether or not a match with a tail end traveling locus ID exists (step ST218). More specifically, the temporary registration unit 23 determines whether or not the traveling locus IDs of the temporarily registered roads extracted in the step ST216 match a traveling locus ID at rearmost end. When it is determined in the step ST218 that the traveling locus IDs do not match the tail end traveling locus ID, the sequence returns to the step ST213, in which the processing described above is repeated.

When it is determined in the step ST218 that the traveling locus IDs match the tail end traveling locus ID, on the other hand, addition processing to the map data is performed (step ST219). More specifically, the official registration unit 24 receives the traveling locus data from the temporary registration unit 23, generates road data on the basis of the received traveling locus data, and transmits the generated road data to the map data storage unit 1. As a result, a plurality of temporarily registered roads are added to the map data in the map data storage unit 1 as the road data of a single officially registered road.

Next, addition registration processing to the officially registered road list is performed (step ST220). More specifically, the official registration unit 24 adds a road having the traveling locus data received from the temporary registration unit 23 to the officially registered road list as an officially registered road. As a result, a plurality of temporarily registered roads are added to the officially registered road list as a single officially registered road.

Next, all of the extracted temporarily registered roads are deleted from the temporarily registered road list (step ST221). More specifically, the temporary registration unit 23 deletes all of the temporarily registered roads extracted in the processing of the steps ST211 to ST218 from the temporarily registered road list. Next, the extracted inter-temporarily registered road traveling locus data are deleted from the inter-temporarily registered road traveling locus data list (step ST222). More specifically, the temporary registration unit 23 deletes all of the inter-temporarily registered road traveling locus data extracted in the step ST213 from the inter-temporarily registered road traveling locus data list. The official registration processing is then completed.

As described above, in accordance with the map information processing apparatus of the fifteenth embodiment of this invention, a plurality of temporarily registered roads are joined to form a single officially registered road, and therefore correct new road can be added even in the case where the single new road has registered as a plurality of divided temporarily registered roads.

Sixteenth Embodiment

In a map information processing apparatus in accordance with a sixteenth embodiment of this invention, a single temporarily registered road is registered officially after being divided into a plurality. The constitution of the map information processing apparatus in accordance with the sixteenth embodiment is identical to the constitution of the map information processing apparatus in accordance with the first embodiment, shown in FIG. 1.

Figure 49:
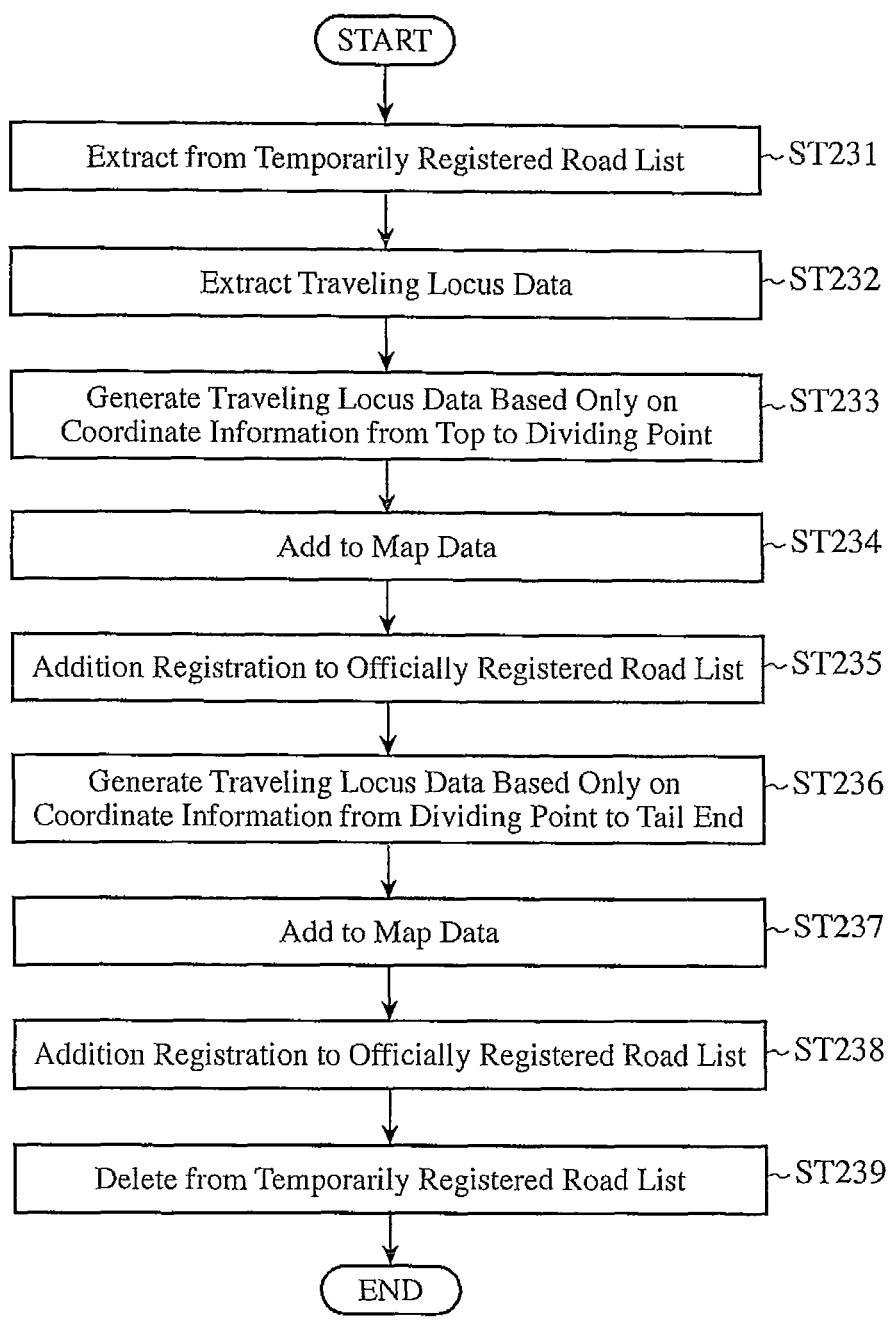
FIG. 49 is a flowchart showing an operation of a map information processing apparatus in accordance with a sixteenth embodiment of this invention, centering on official registration processing in which a temporarily registered road is divided before being officially registered.

Next, official registration processing performed by the map information processing apparatus in accordance with the sixteenth embodiment, in which a single temporarily registered road is registered as an officially registered road after being divided into a plurality, will be described with reference to a flowchart shown in FIG. 49. This official registration processing is begun when the "official registration" button is pressed on a temporarily registered road list screen such as that shown in FIG. 10, for example.

In the official registration processing, first, a temporarily registered road is extracted from the temporarily registered road list (step ST231). More specifically, the temporary registration unit 23 extracts a single temporarily registered road from the temporarily registered road list. Next, the traveling locus data are extracted (step ST232). More specifically, the temporary registration unit 23 extracts the traveling locus data of the temporarily registered road extracted in the step ST231 and transmits the extracted traveling locus data to the traveling locus data generation unit 21.

Next, traveling locus data are generated on the basis of only coordinate information extending from the top to a dividing point (step ST233). More specifically, the traveling locus data generation unit 21 generates traveling locus data on the basis of the traveling locus coordinates from the top to the dividing point, and transmits the generated traveling locus data to the official registration unit 24. The dividing point may be specified on the screen using a touch panel, for example. Next, addition processing to the map data is performed (step ST234). More specifically, the official registration unit 24 receives the traveling locus data from the traveling locus data generation unit 21, generates road data on the basis of the received traveling locus data, and transmits the generated road data to the map data storage unit 1. As a result, a part of a single temporarily registered road is added to the map data in the map data storage unit 1 as the road data of an officially registered road.

Next, addition registration processing to the officially registered road list is performed (step ST235). More specifically, the official registration unit 24 adds a road having the traveling locus data received from the traveling locus data generation unit 21 to the officially registered road list as an officially registered road. As a result, a part of a single temporarily registered road is added to the officially registered road list as an officially registered road.

Next, traveling locus data are generated on the basis of only coordinate information extending from the dividing point to a tail end (step ST236). More specifically, the traveling locus data generation unit 21 generates traveling locus data on the basis of traveling locus coordinates extending from the dividing point to the tail end and transmits the generated traveling locus data to the official registration unit 24. Next, addition processing to the map data is performed (step ST237). The processing of the step ST237 is identical to the processing of the step ST234. Next, addition registration processing to the officially registered road list is performed (step ST238). The processing of the step ST238 is identical to the processing of the step ST235. Next, deletion from the temporarily registered road list is performed (step ST239). More specifically, the temporary registration unit 23 deletes the temporarily registered road extracted in the step ST231 from the temporarily registered road list. The official registration processing is then completed.

As described above, in accordance with the map information processing apparatus of the sixteenth embodiment of this invention, a single temporarily registered road is registered as an officially registered road after being divided into a plurality, and it is therefore possible to register only a required part of a temporarily registered road officially. Note that in the sixteenth embodiment, a case in which a single dividing point exists was described, but even when a plurality of dividing points exist, a single temporarily registered road can be registered as an officially registered road after being divided into three or more parts through similar processing to the processing described above.

Seventeenth Embodiment

In a map information processing apparatus in accordance with a sixteenth embodiment of this invention, a part of a single temporarily registered road is officially registered. The constitution of the map information processing apparatus in accordance with the seventeenth embodiment is identical to the constitution of the map information processing apparatus in accordance with the first embodiment, shown in FIG. 1.

Figure 50:
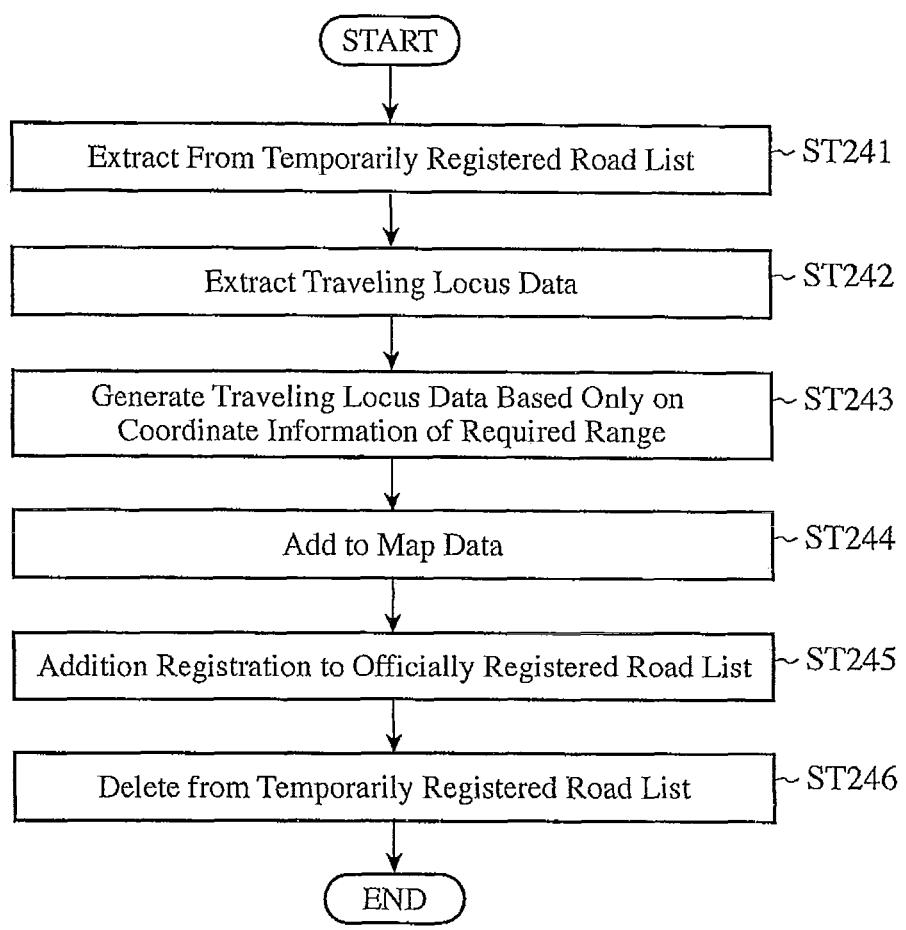
FIG. 50 is a flowchart showing an operation of a map information processing apparatus in accordance with a seventeenth embodiment of this invention, centering on official registration processing in which only a predetermined part of a temporarily registered road is officially registered.

Next, official registration processing performed by the map information processing apparatus in accordance with the seventeenth embodiment, in which a part of a single temporarily registered road is registered as an officially registered road, will be described with reference to a flowchart shown in FIG. 50. This official registration processing is begun when the "official registration" button is pressed on a temporarily registered road list screen such as that shown in FIG. 10, for example.

In the official registration processing, first, a temporarily registered road is extracted from the temporarily registered road list (step ST241). More specifically, the temporary registration unit 23 extracts a single temporarily registered road from the temporarily registered road list. Next, the traveling locus data are extracted (step ST242). More specifically, the temporary registration unit 23 extracts the traveling locus data of the temporarily registered road extracted in the step ST241 and transmits the extracted traveling locus data to the traveling locus data generation unit 21.

Next, traveling locus data are generated on the basis of only coordinate information of a required range (step ST243). More specifically, the traveling locus data generation unit 21 generates traveling locus data on the basis of the traveling locus coordinates of the required range and transmits the generated traveling locus data to the official registration unit 24. The required range may be specified on the screen using a touch panel, for example. Next, addition processing to the map data is performed (step ST244). More specifically, the official registration unit 24 receives the traveling locus data from the traveling locus data generation unit 21, generates road data on the basis of the received traveling locus data, and transmits the generated road data to the map data storage unit 1. As a result, only a predetermined range of a single temporarily registered road is added to the map data in the map data storage unit 1 as the road data of an officially registered road.

Next, addition registration processing to the officially registered road list is performed (step ST245). More specifically, the official registration unit 24 adds a road having the traveling locus data received from the traveling locus data generation unit 21 to the officially registered road list as an officially registered road. As a result, only a predetermined range of a single temporarily registered road is added to the officially registered road list as an officially registered road. Next, deletion from the temporarily registered road list is performed (step ST246). More specifically, the temporary registration unit 23 deletes the temporarily registered road extracted in the step ST241 from the temporarily registered road list. The official registration processing is then completed.

As described above, in accordance with the map information processing apparatus of the seventeenth embodiment of this invention, only a required range of a single temporarily registered road is registered as an officially registered road, and it is therefore possible to register only a required part of a temporarily registered road officially.

INDUSTRIAL APPLICABILITY

As illustrated above, the map information processing apparatus according to this invention adds a new road to the map data only after a user has verified a temporarily registered road, and therefore the map information processing apparatus can generate map data including accurate added road data relating to a road that does not exist in the map data. Hence, the map information processing apparatus according to this invention is suitable for use in a car navigation apparatus or the like that employs map data recorded on a CD-ROM, a DVD-ROM, and so on.

The invention claimed is:
1. A map information processing apparatus comprising:
a map data storage unit configured to store map data;
a processor configured to calculate a vehicle position;
a traveling locus data generation unit configured to generate traveling locus data on the basis of said vehicle position calculated by said processor when said vehicle position deviates from a road indicated by road data that are included in said map data read from said map data storage unit;
a temporary registration unit configured to register said traveling locus data generated by said traveling locus data generation unit in a temporarily registered road list as a temporarily registered road, wherein said temporarily registered road list includes a plurality of temporarily registered roads;
an operation unit configured to select one of said temporarily registered roads registered in said temporarily registered road list by said temporary registration unit; and
an official registration unit configured to register said temporarily registered road selected by said operation unit in an officially registered road list as an officially registered road in accordance with an instruction from said operation unit, wherein said instruction comprises:

instructing said temporary registration unit to transmit a predetermined part of said selected temporarily registered road to said traveling locus data generation unit, and instructing said traveling locus data generation unit to generate traveling locus data relating to said predetermined part of said temporarily registered road and to transmit said generated traveling locus data to said official registration unit, wherein and said official registration unit generates road data on the basis of said generated traveling locus data relating to said predetermined part of said selected temporarily registered road, and adding said generated road data to said map data stored in said map data storage unit.

2. The map information processing apparatus according to claim 1, further comprising a display unit, wherein when said temporary registration unit has registered said temporarily registered road in said temporarily registered road list, said temporary registration unit causes said display unit to display said registered temporarily registered road together with a message indicating that registration of said temporarily registered road is complete.

3. The map information processing apparatus according to claim 1, further comprising a display unit, wherein said processor calculates said vehicle position on the basis of a signal received by a GPS receiver, and when said temporary registration unit has registered said temporarily registered road in said temporarily registered road list, said temporary registration unit causes said display unit to display said registered temporarily registered road and a reliability value corresponding to a reception condition of said GPS receiver.

4. The map information processing apparatus according to claim 1, wherein said temporary registration unit corrects a shape of said temporarily registered road registered in said temporarily registered road list in accordance with an instruction from said operation unit.

5. The map information processing apparatus according to claim 1, wherein said temporary registration unit sets or modifies attributes of said temporarily registered road registered in said temporarily registered road list in accordance with an instruction from said operation unit.

6. The map information processing apparatus according to claim 1, wherein when said official registration unit registers said temporarily registered road in said officially registered road list as an officially registered road, said official registration unit sets attributes of said officially registered road in accordance with an instruction from said operation unit, generates road data on the basis of said traveling locus data and said set attribute of said registered officially registered road, and adds said generated road data to said map data stored in said map data storage unit.

7. The map information processing apparatus according to claim 1, wherein in accordance with an instruction from said operation unit, said official registration unit sets or modifies attributes of an officially registered road registered in said officially registered road list and set or modifies attributes of road data in said map data storage unit corresponding to said officially registered road.

8. The map information processing apparatus according to claim 1, wherein in accordance with an instruction from said operation unit, said official registration unit returns an officially registered road selected by said operation unit to said temporarily registered road list as a temporarily registered road and deletes map data corresponding to said selected officially registered road from said map data storage unit.

9. The map information processing apparatus according to claim 1, further comprising a map data comparison unit for comparing said traveling locus data generated by said traveling locus data generation unit with traveling locus data of a temporarily registered road registered in said temporarily registered road list, wherein when a comparison result generated by said map data comparison unit indicates a match, said temporary registration unit corrects said traveling locus data of said temporarily registered road registered in said temporarily registered road list, using said traveling locus data generated by said traveling locus data generation unit.

10. The map information processing apparatus according to claim 1, wherein said temporary registration unit registers said traveling locus data generated by said traveling locus data generation unit as a result of travel on a temporarily registered road registered in said temporarily registered road list in said temporarily registered road list as an identical temporarily registered road, and in accordance with an instruction from said operation unit, said official registration unit registers one of identical temporarily registered roads selected by said operation unit in said officially registered road list as an officially registered road, generates road data on the basis of said traveling locus data of said selected temporarily registered road, and adds said generated road data to said map data stored in said map data storage unit.

11. The map information processing apparatus according to claim 1, wherein in accordance with an instruction from said operation unit, said traveling locus data generation unit sets an area in which temporary registration is prohibited on a map illustrated by map data read from said map data storage unit, and generates said traveling locus data on the basis of said vehicle position calculated by said processor when said vehicle position deviates from a road indicated by road data that are included in said map data read from said map data storage unit and remains outside of said set area in which temporary registration is prohibited.

12. The map information processing apparatus according to claim 11, wherein said temporary registration unit selects one of said temporarily registered roads registered in said temporarily registered road list in accordance with an instruction from said operation unit, and said traveling locus data generation unit sets said area in which temporary registration is prohibited on the basis of coordinates of traveling locus data relating to said temporarily registered road selected by said temporary registration unit.

13. The map information processing apparatus according to claim 11, wherein said temporary registration unit selects one of said temporarily registered roads registered in said temporarily registered road list in accordance with an instruction from said operation unit and deletes said selected temporarily registered road after said area in which temporary registration is prohibited has been set, and said traveling locus data generation unit sets said area in which temporary registration is prohibited on the basis of coordinates of traveling locus data of said temporarily registered road selected by said temporary registration unit.

14. The map information processing apparatus according to claim 11, wherein said official registration unit selects one of said officially registered roads registered in said officially registered road list in accordance with an instruction from said operation unit, and after said area in which temporary registration is prohibited has been set, deletes said selected officially registered road and deletes road data corresponding to said officially registered road from said map data stored in said map data storage unit, and said traveling locus data generation unit sets said area in which temporary registration is prohibited on the basis of coordinates of traveling locus data of said officially registered road selected by said official registration unit.

15. The map information processing apparatus according to claim 11, further comprising a temporary registration prohibited area list indicating a list of said areas in which temporary registration is prohibited, wherein in accordance with an instruction from said operation unit, said traveling locus data generation unit cancels a setting of an area in which temporary registration is prohibited selected in said temporary registration prohibited area list.

16. The map information processing apparatus according to claim 1, further comprising a map data updating unit for updating said map data stored in said map data storage unit periodically after an officially registered road has been returned to said temporarily registered road list as a temporarily registered road by said official registration unit.

17. The map information processing apparatus according to claim 16, wherein said official registration unit adds a temporarily registered road that does not exist in said map data updated by said map data updating unit to said map data stored in said map data storage unit as road data relating to an officially registered road.

18. The map information processing apparatus according to claim 16, wherein said temporary registration unit extracts a temporarily registered road from said temporarily registered road list and transmits said extracted temporarily registered road to said official registration unit, and when said temporarily registered road received from said temporary registration unit does not exist in said map data updated by said map data updating unit, said official registration unit registers said temporarily registered road in an official registration candidate list as an official registration candidate, extracts an official registration candidate from said official registration candidate list in accordance with an instruction from said operation unit, registers said extracted official registration candidate in said officially registered road list as an officially registered road, generates road data on the basis of traveling locus data relating to said official registration candidate extracted from said official registration candidate list, and adds said generated road data to said map data stored in said map data storage unit.

* * * * *